United States Patent
Nakamura et al.

(10) Patent No.: US 7,062,287 B2
(45) Date of Patent: Jun. 13, 2006

(54) TRANSMISSION POWER CONTROL APPARATUS

(75) Inventors: Satoshi Nakamura, Kawasaki (JP); Morihiko Minowa, Kawasaki (JP); Noriyuki Kawaguchi, Sapporo (JP); Kensuke Sawada, Kawasaki (JP); Tokuro Kubo, Kawasaki (JP); Dai Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/072,058

(22) Filed: Feb. 8, 2002

(65) Prior Publication Data

US 2002/0094836 A1 Jul. 18, 2002

Related U.S. Application Data

(63) Continuation of application No. PCT/JP99/05183, filed on Sep. 22, 1999.

(51) Int. Cl.
*H04B 7/00* (2006.01)
*H04Q 7/20* (2006.01)

(52) U.S. Cl. .................... 455/522; 455/69; 455/134; 455/67.15; 370/318

(58) Field of Classification Search ............. 455/522, 455/69, 132, 134, 135, 68, 10, 41, 67.11, 455/67.13, 67.15, 67.16, 524, 60, 62, 63.1, 455/65, 506, 143; 370/318, 320; 375/140, 375/142, 144
See application file for complete search history.

(56) References Cited

U.S. PATENT DOCUMENTS

| | | | |
|---|---|---|---|
| 5,802,110 A | * | 9/1998 | Watanabe et al. ............ 375/259 |
| 5,812,593 A | | 9/1998 | Kaku |
| 5,873,028 A | | 2/1999 | Nakano et al. |
| 6,032,050 A | * | 2/2000 | Hasegawa ................... 455/517 |
| 6,249,682 B1 | | 6/2001 | Kubo et al. |
| 6,317,587 B1 | * | 11/2001 | Tiedemann, Jr. et al. ..... 455/69 |
| 6,335,923 B1 | | 1/2002 | Kubo et al. |
| 6,341,224 B1 | * | 1/2002 | Dohi et al. ................. 455/522 |
| 6,377,813 B1 | * | 4/2002 | Kansakoski et al. ........ 455/522 |
| 6,456,827 B1 | | 9/2002 | Kubo et al. |

FOREIGN PATENT DOCUMENTS

| | | |
|---|---|---|
| EP | 0 682 419 | 11/1995 |

(Continued)

*Primary Examiner*—Nick Corsaro
*Assistant Examiner*—Edan Orgad
(74) *Attorney, Agent, or Firm*—Katten Muchin Rosenman LLP

(57) ABSTRACT

In a transmission power control apparatus for measuring SIR, which is a ratio of a receive signal to an interference signal, and controlling transmission power of a mobile station in such a manner that the measured SIR will agree with a target SIR, a fading detector detects the rate of change in fading, a correction unit corrects the target SIR based upon the rate of change in fading, and a transmission power control command creation unit creates a command for controlling transmission power of the mobile station in such a manner that the measured SIR will agree with the corrected target SIR, and transmits this command. Further, a searcher detects multipath and the levels of signals that arrive via respective ones of the paths, a level-difference calculation unit calculates level differences between the paths, a correction unit corrects the target SIR based upon the level differences between the paths, and a transmission power control command creation unit creates a command for controlling transmission power of the mobile station in such a manner that the measured SIR will agree with the corrected target SIR, and transmits this command.

10 Claims, 27 Drawing Sheets

| | FOREIGN PATENT DOCUMENTS | | |
|---|---|---|---|
| EP | 0 762 668 | | 3/1997 |
| JP | 01032727 | | 2/1989 |
| JP | 7-231278 | | 8/1995 |
| JP | 709973 | * | 5/1996 |
| JP | 0835898 | | 5/1996 |
| JP | 08125604 | | 5/1996 |
| JP | 0818653 | | 7/1996 |
| JP | 08-181653 | | 7/1996 |
| JP | 09-214410 | | 8/1997 |
| JP | 10-022885 | | 1/1998 |
| JP | 10-079701 | | 3/1998 |
| JP | 11-008606 | | 1/1999 |
| JP | 11-055166 | | 2/1999 |
| JP | 11-068647 | | 3/1999 |
| JP | 11-068700 | | 3/1999 |
| JP | 11-215053 | | 8/1999 |
| JP | 11-220774 | | 8/1999 |
| WO | 94/18756 | | 8/1994 |

* cited by examiner

FIG. 10

| ADDRESS | LEVEL DIFFERENCE (dB) A BETWEEN PATHS 1 AND 2 | LEVEL DIFFERENCE (dB) B BETWEEN PATHS 2 AND 3 | LEVEL DIFFERENCE (dB) C BETWEEN PATHS 3 AND 4 |
|---|---|---|---|
| 0 | 15 | 0 | 0 |
| 1 | 14 | 0 | 1 |
| 2 | 14 | 1 | 0 |
| 3 | 13 | 0 | 0 |
| 4 | 13 | 0 | 1 |
| 5 | 13 | 0 | 2 |
| 6 | 13 | 1 | 0 |
| 7 | 13 | 1 | 1 |
| 8 | 13 | 2 | 0 |
| 9 | 12 | 0 | 0 |
| 10 | 12 | 0 | 1 |
| 11 | 12 | 0 | 2 |
| 12 | 12 | 0 | 3 |
| 13 | 12 | 1 | 0 |
| 14 | 12 | 1 | 1 |
| 15 | 12 | 1 | 2 |
| 16 | 12 | 2 | 0 |
| 17 | 12 | 2 | 1 |
| 18 | 12 | 3 | 0 |
| 19 | 11 | 0 | 0 |
| 20 | 11 | 0 | 1 |
| 21 | 11 | 0 | 2 |
| 22 | 11 | 0 | 3 |
| 23 | 11 | 0 | 4 |
| 24 | 11 | 1 | 0 |
| 25 | 11 | 1 | 1 |
| 26 | 11 | 1 | 2 |
| 27 | 11 | 1 | 3 |
| 28 | 11 | 2 | 0 |
| 29 | 11 | 2 | 1 |
| 30 | 11 | 2 | 2 |
| 31 | 11 | 3 | 0 |
| 32 | 11 | 3 | 1 |
| 33 | 11 | 4 | 0 |
| 34 | 10 | 0 | 0 |
| 35 | 10 | 0 | 1 |
| 36 | 10 | 0 | 2 |
| 37 | 10 | 0 | 3 |
| 38 | 10 | 0 | 4 |
| 39 | 10 | 0 | 5 |
| 40 | 10 | 1 | 0 |
| 41 | 10 | 1 | 1 |
| 42 | 10 | 1 | 2 |

FIG. 11

| | A | B | C |
|---|---|---|---|
| 770 | 0 | 7 | 0 |
| 771 | 0 | 7 | 1 |
| 772 | 0 | 7 | 2 |
| 773 | 0 | 7 | 3 |
| 774 | 0 | 7 | 4 |
| 775 | 0 | 7 | 5 |
| 776 | 0 | 7 | 6 |
| 777 | 0 | 7 | 7 |
| 778 | 0 | 7 | 8 |
| 779 | 0 | 8 | 0 |
| 780 | 0 | 8 | 1 |
| 781 | 0 | 8 | 2 |
| 782 | 0 | 8 | 3 |
| 783 | 0 | 8 | 4 |
| 784 | 0 | 8 | 5 |
| 785 | 0 | 8 | 6 |
| 786 | 0 | 8 | 7 |
| 787 | 0 | 9 | 0 |
| 788 | 0 | 9 | 1 |
| 789 | 0 | 9 | 2 |
| 790 | 0 | 9 | 3 |
| 791 | 0 | 9 | 4 |
| 792 | 0 | 9 | 5 |
| 793 | 0 | 9 | 6 |
| 794 | 0 | 10 | 0 |
| 795 | 0 | 10 | 1 |
| 796 | 0 | 10 | 2 |
| 797 | 0 | 10 | 3 |
| 798 | 0 | 10 | 4 |
| 799 | 0 | 10 | 5 |
| 800 | 0 | 11 | 0 |
| 801 | 0 | 11 | 1 |
| 802 | 0 | 11 | 2 |
| 803 | 0 | 11 | 3 |
| 804 | 0 | 11 | 4 |
| 805 | 0 | 12 | 0 |
| 806 | 0 | 12 | 1 |
| 807 | 0 | 12 | 2 |
| 808 | 0 | 12 | 3 |
| 809 | 0 | 13 | 0 |
| 810 | 0 | 13 | 1 |
| 811 | 0 | 13 | 2 |
| 812 | 0 | 14 | 0 |
| 813 | 0 | 14 | 1 |
| 814 | 0 | 15 | 0 |

FIG. 26
(a)
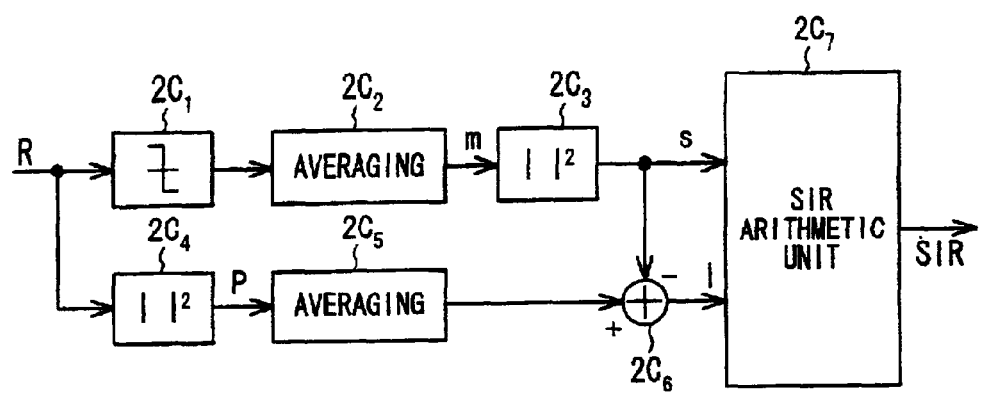
(b)
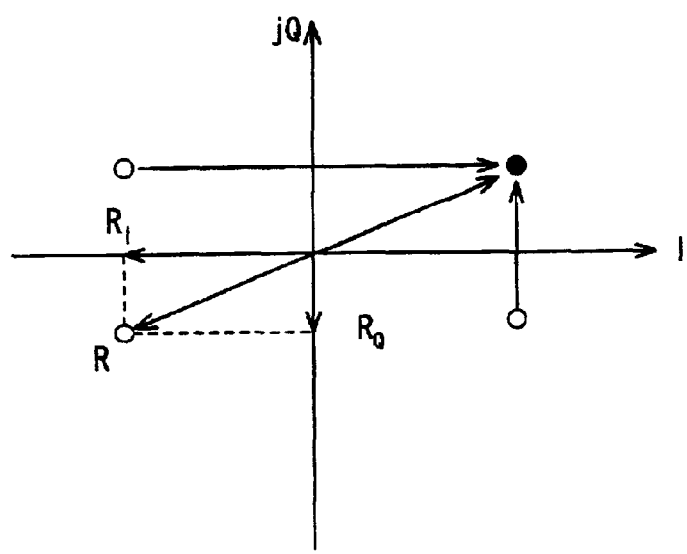

TRANSMISSION POWER CONTROL APPARATUS

This application is a continuation of PCT/JP99/05183, filed Sep. 22, 1999, currently pending.

BACKGROUND OF THE INVENTION

This invention relates to a transmission power control apparatus of a base station for controlling the transmission power of a mobile station in a CDMA mobile communication system. More particularly, the invention relates to a transmission power control apparatus for obtaining a desired value of BER (Bit Error Rate) by correcting a SIR (target SIR), which is the target of transmission power control, based upon fading pitch or level differences between paths.

Analog schemes were used as modulation schemes for mobile communication in the past but present-day schemes are mainly digital. In general, an analog cellular scheme is referred to as a first-generation scheme, and a digital scheme such as PDC (the Japanese standard), GSM (the European standard), IS54 (the TDMA standard in the USA) and IS95 (the CDMA standard in the USA) is referred to as a second-generation scheme. Voice service is the focus up to the second generation, in which full use is made of analog/digital narrow-band modulation/demodulation to achieve communication by making effective utilization of the limited radio band.

In next-generation schemes, however, it will be possible to perform not only telephone conversation but also communication by facsimile and electronic mail, etc., and communication between computers. In order to achieve this, a desired communication scheme for the next generation will be one in which various information (multimedia information) services for moving and still images will be possible in addition to voice and information provided by communication means, and in which high-quality communication is made possible in such a manner that the mobile network is transparent to the user. DS-CDMA (Direct Sequence Code Division Multiple Access) communication is the focus of attention as a promising candidate for next-generation wireless access. Such a DS-CDMA communication scheme achieves spectrum spreading by directly multiplying a signal, which is to undergo spectrum spreading, by a signal having a band much broader than that of the first-mentioned signal.

FIG. 24 is a block diagram showing a CDMA receiver having a diversity construction in which outputs from respective ones of branches are combined by maximal ratio combining and data is discriminated based upon the combined results. Each of branches B1 and B2 has a radio unit 11 for converting a high-frequency signal received by an antenna 10 to a baseband signal by applying a frequency conversion (RF→IF conversion). A quadrature detector 12 subjects the baseband signal to quadrature detection and outputs in-phase component (I-component) data and quadrature-component (Q-component) data. The quadrature detector 12 includes a receive-carrier generator 12a, a phase shifter 12b for shifting the phase of the receive carrier by π/2, and multipliers 12c, 12d for multiplying the baseband signal by the receive carrier and outputting the I-component signal and the Q-component signal. Low-pass filters (LPF) 13a, 13b limit the bands of these output signals and AD converters 15a, 15b convert the I- and Q-component signals to digital signals and input the digital signals to a searcher 16, fingers $17a_1$ to $17a_4$ and a reception power measurement unit 18.

When a direct-sequence signal (DS signal) that has been influenced by multipath is input to the searcher 16, the latter performs an autocorrelation operation using a matched filter (not shown), thereby detecting multipath, and inputs despreading-start timing data and delay-time adjustment data of the respective paths to the fingers $17a_1$ to $17a_4$ corresponding to the respective paths. A despreader/delay-time adjusting unit 21 of each of the fingers $17a_1$ to $17a_4$ subjects a direct wave or a delayed wave that arrives via a prescribed path to despread processing using a code identical with the spreading code, performs dump integration, then applies delay processing conforming to the path and outputs two types of signals, namely a pilot signal (reference signal) and information signal. A phase compensator (channel estimation unit) 22 averages the voltages of the I- and Q-components of the pilot signal over a prescribed number of slots and outputs channel estimation signals It, Qt. A synchronous detector 23 restores the phases of despread information signals I', Q' based upon a phase difference θ between a pilot signal contained in the receive signal and an already known pilot signal. That is, since the channel estimation signals $I_t$, $Q_t$ are cosine and sine components of phase difference θ, the synchronous detector 23 performs demodulation (synchronous detection) of receive information signals (I,Q) by applying phase rotation processing to reception information signals (I',Q') in accordance with the following equation using the channel estimation signals $$(I_t, Q_t): \begin{pmatrix} I \\ Q \end{pmatrix} = \begin{pmatrix} It & Qt \\ -Qt & It \end{pmatrix} \begin{pmatrix} I' \\ Q' \end{pmatrix} \quad (1)$$

A RAKE combiner 17b combines the signals output from the fingers $17a_1$ to $17a_4$, a multiplier 17d multiplies the combined output of the RAKE combiner by a weighting that conforms to the reception power and outputs the weighted signal, a maximal ratio combiner 19 combines the outputs of respective branches at a ratio that conforms to the size of reception power, and a discrimination unit 20 performs data discrimination based upon the output of the maximal ratio combiner.

With DS-CDMA, all users (all channels) employ the same frequency band in communication with the base station. Consequently, in a case where mobile stations transmit to a base station, a so-called near-far problem occurs. Specifically, if a mobile station near the base station and a mobile station far from the base station transmit at the same power, the transmission power of the nearby mobile station will be more than necessary and will interfere with transmission from the other mobile station. Therefore, in the uplink for mobile-station transmission/base-station reception, the usual practice is to exercise transmission power control for controlling the transmission power of each mobile station in such a manner that reception power will be constant at the base station.

FIG. 25 is a diagram useful in describing uplink-channel closed-loop transmission power control. Here a mobile station 1 includes a spread-spectrum modulator 1a for spread-spectrum modulating transmit data using a spreading code conforming to a prescribed channel specified by a base station, and a power amplifier 1b for amplifying a signal, which is input thereto following processing such as quadrature modulation and frequency conversion applied after spread-spectrum modulation, and transmitting the amplified signal to a base station 2 from an antenna. The base station 2 includes despreaders 2a of respective fingers conforming to the respective paths for applying despread processing to a delay signal that arrives via the assigned path, and a RAKE demodulator $2b$ for combining the signals output from the fingers, subjecting the combined signal to maximal ratio combining at a weighting conforming to the reception power of each branch, and discriminating "1"s and "0"s of the receive data based upon the maximal-ratio combination signal.

A SIR measurement unit $2c$ measures the power ratio (SIR: Signal Interference Ratio) of the receive signal (Signal) to an interference signal (Interference), which includes thermal noise. (a) of FIG. 26 shows an example of the SIR measurement unit $2c$. A signal-point position altering unit $2c_1$ which, as shown in (b) of FIG. 26, converts a position vector R (whose I and Q components are $R_I$ and $R_Q$, respectively) of a reference (pilot) in the I-jQ complex plane to a point in the first quadrant of the plane. More specifically, the signal-point position altering unit $2c_1$ takes the absolute values of the I component (in-phase component) $R_I$ and Q component (quadrature component) $R_Q$ of the position vector R of the received signal point to convert this position vector to a signal in the first quadrant of the I-jQ complex plane. An averaging arithmetic unit $2c_2$ for calculating the average value m of M symbols of the reference signal included in one slot, a desired wave power arithmetic unit $2c_3$ for calculating $m^2$ (the power S of the desired signal) by squaring the I and Q components of the average value m and summing the squares, and a reception power calculation unit $2c_4$ for squaring the I and Q components $R_I$, $R_Q$ of the position vector of the reference signal and summing the squares, i.e., for performing the following calculation:

$$P=R_I^2+R_Q^2 \quad (2)$$

to thereby calculate the reception power P. An average-value arithmetic unit $2c_5$ calculates the average value of reception power, and a subtractor $2c_6$ subtracts $m^2$ (the power S of the desired wave) from the average value of the reception power, thereby outputting interference wave power I. A SIR arithmetic unit $2c_7$ calculates the SIR from the desired wave power S and interference wave power I in accordance with the equation $$SIR=S/I \quad (3)$$

With reference again to FIG. 25, a comparator $2d$ compares the measured SIR with a target SIR, creates a command which lowers the transmission power using a TPC (Transmission Power Control) bit if the measured SIR is greater than the target SIR, and creates a command to raise the transmission power using the TPC bit if the measured SIR is less than the target SIR. The target SIR is a SIR value necessary to obtain a BER of, e.g., $10^{-3}$ (error occurrence at a rate of one error per 1000). The target SIR is input to the comparator $2d$ from a target-SIR setting unit $2e$. A spread-spectrum modulator $2f$ spread-spectrum modulates the transmit data and TPC bits. After spread-spectrum modulation, the base station 2 executes processing such as DA conversion, quadrature modulation, frequency conversion and power amplification and transmits the results to the mobile station 1 from an antenna. A despreader $1c$ in the mobile station 1 applies despread processing to the signal received from the base station 2, and a RAKE demodulator $1d$ demodulates the receive data and TPC bits and controls the transmission power of the power amplifier $1b$ in accordance with a command specified by the TPC bit.

The mobile station 1 and base station 2 perform the above-described transmission power control on a per-slot basis (a) of FIG. 27 is a diagram useful in describing frame/slot structure of an uplink signal from the mobile station 1 to the base station 2. One frame (10 ms) is composed of 16 625-µs slots $S_0$ to $S_{15}$, each of which consists of, e.g., ten symbols. Each slot constituting a frame for an I component transmits 10 symbols of information, and each slot constituting a frame for a Q component transmits six symbols of a reference signal (pilot) and other signals. The SIR measurement unit $2c$ measures, slot by slot, the SIR using the six-symbol reference signal contained in each slot of the Q-component frame, and the comparator $2d$ creates the transmission-power control command using the TCP bit, as mentioned above, in conformity with the comparison between the measured SIR and the target SIR. The base station 2 transmits this transmission-power control command to the mobile station 1 every 625 µs, as shown in (b) of FIG. 27, and the mobile station 1 controls the transmission power in accordance with this command. Since the control cycle is $T_{slot}=0.625$ ms, control is capable of following up momentary fluctuation.

When the sending and receiving of voice is considered, it is appropriate to control transmission power upon setting the target SIR so as to obtain a BER on the order of $10^{-3}$. If the traveling speed of the mobile station 1 is constant in this case, the BER of $10^{-3}$ can be achieved by transmission power control even if the target SIR is fixed. However, if the traveling speed of the mobile station varies and the rate of change in fading increases [i.e., if fading pitch (Hz) rises], then transmission power control based upon the TPC bit can no longer follow up the change in fading. In addition, channel estimation becomes erroneous and BER=$10^{-3}$ can no longer be maintained.

Further, RAKE gain differs depending also upon the level difference between receive signals on the paths of multiple paths. With conventional transmission power control, a problem which arises is that BER=$10^{-3}$ can no longer be maintained owing to the number of paths or the level differences between paths. The reason why RAKE gain varies is that when the level of a certain path falls owing to fading, the levels of other paths rise to make up for the fall but this effect depends upon the number of paths and the level differences between paths.

SUMMARY OF THE INVENTION

Accordingly, an object of the present invention is to enlarge the target SIR so that the desired BER can be maintained when the rate of change in fading (the fading pitch) increases.

Another object of the present invention is to control the target SIR, thereby making it possible to maintain the desired BER, based upon level differences between signals that arrive via the paths of multiple paths.

Another object of the present invention is to control the target SIR, thereby making it possible to maintain the desired BER, based upon a combination of rate of change in fading and level differences between signals that arrive via each path.

Another object of the present invention is to correct a correction value of target SIR, which is decided based upon a combination of rate of change in fading and level differences between signals that arrive via each path, in accordance with the magnitudes of a measured BER and target BER, thereby making it possible to maintain the desired BER.

Another object of the present invention is to correct a correction value of target SIR, which is decided based upon a combination of rate of change in fading and level differences between signals that arrive via each path, in accordance with the magnitudes of a measured FER (Frame Error Rate) and target FER, thereby making it possible to maintain the desired BER.

A transmission power control apparatus according to the present invention measures SIR, which is the ratio of a receive signal to an interference signal, and controls the transmission power of a mobile station in such a manner that the measured SIR will agree with a target SIR. In such a transmission power control apparatus, a fading detector detects the rate of change in fading, a correction unit corrects the target SIR based upon the rate of change in fading, and a transmission power control command creation unit creates a command for controlling transmission power of a mobile station in such a manner that the measured SIR will agree with the corrected target SIR, and transmits this command to the mobile station. If this arrangement is adopted, the desired BER can be maintained by enlarging the target SIR when the rate of change of fading increases.

The transmission power control apparatus of the present invention measures SIR, which is the ratio of a receive signal to an interference signal, and controls the transmission power of a mobile station in such a manner that the measured SIR will agree with a target SIR. In such a transmission power control apparatus, a searcher detects multipath and levels of signals, which arrive via respective ones of the paths, a level-difference calculation unit calculates level differences between paths using the levels of signals, a correction unit corrects the target SIR based upon the level difference between paths, and a transmission power control command creation unit creates a command for controlling transmission power of a mobile station in such a manner that the measured SIR will agree with the corrected target SIR, and transmits this command to the mobile station. If this arrangement is adopted, the desired BER can be maintained even if there is a change in the level difference of signals that arrive via the paths of the multiple paths.

A transmission power control apparatus according to the present invention measures SIR, which is the ratio of a receive signal to an interference signal, and controls the transmission power of a mobile station in such a manner that the measured SIR will agree with a target SIR. In such a transmission power control apparatus, a fading detector detects the rate of change of fading, a searcher detects multipath and levels of signals, which arrive via respective ones of the paths, a level-difference calculation unit calculates level differences between paths using the levels of signals, a correction unit corrects the target SIR based upon a combination of the rate of change in fading and the level differences between paths, and a transmission power control command creation unit creates a command for controlling transmission power of a mobile station in such a manner that the measured SIR will agree with the corrected target SIR, and transmits this command to the mobile station.

If the arrangement described above is adopted, the desired BER can be maintained even if the rate of change in fading increases and even if there is a change in the level differences of signals that arrive via the paths of multiple paths. In this case, if the bit error rate BER is measured, the target SIR is corrected further based upon the difference between the measured BER and target BER and the transmission power of the mobile station is controlled in such a manner that the measured SIR will agree with the corrected target SIR, then the desired BER can be obtained with a higher degree of precision.

Further, if the frame error rate FER is measured, the target SIR is corrected further based upon the difference between the measured FER and a target FER and the transmission power of the mobile station is controlled in such a manner that the measured SIR will agree with the corrected target SIR, then the desired BER can be obtained with a higher degree of precision.

BRIEF DESCRIPTION OF THE DRAWINGS

FIG. 10 shows a decoding table (part 1) of a decoding circuit for converting level differences between paths to an address;

FIG. 11 shows a decoding table (part 2) of a decoding circuit for converting level differences between paths to an address;

FIG. 26 is a diagram useful in describing the structure and operation of a SIR detector.

DESCRIPTION OF THE PREFERRED EMBODIMENTS (A) Overview of the Present Invention FIG. 1 is a diagram useful in describing an overview of a transmission power control apparatus according to the present invention.

Figure 1:
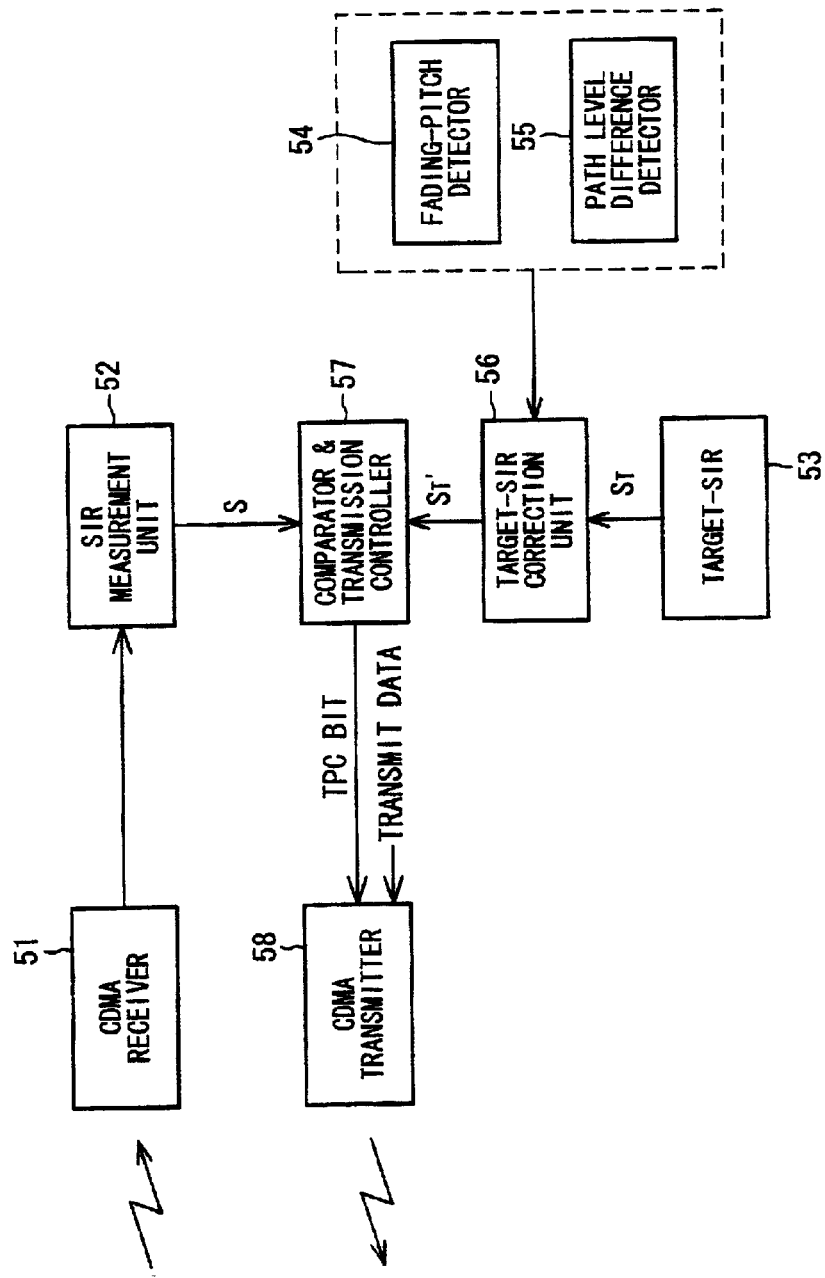
FIG. 1 is a diagram useful in describing an overview of transmission power control according to the present invention.

(a) Control of Target SIR Based Upon Fading Pitch

A CDMA receiver 51 receives a signal transmitted from a mobile station (not shown), and a SIR measurement unit 52 measures receive SIR of a base station slot by slot using a pilot signal included in the receive signal. One slot, which is 625 μs in accordance with CDMA specifications, is composed of ten symbols. One slot includes six pilot symbols. Accordingly, the SIR measurement unit 52 estimates receive SIR every 625 μs using six pilot symbols included in one slot. A target-SIR setting unit 53 sets a target SIR (=$S_T$) necessary to obtain a prescribed BER, e.g., $10^{-3}$.

A fading-pitch detector 54 detects the number of fading cycles [=fading pitch (Hz)] generated at fixed times. If the amplitude of fading is constant, then the higher the fading pitch, the higher the rate of change in fading (the greater the amount of change in fading per unit time). If fading pitch increases, a target-SIR correction unit 56 applies a correction in such a manner that the target SIR increases. A comparator/transmission controller 57 compares the corrected target SIR (=$S_T'$) with measured SIR (=S). If the receive SIR is greater, the comparator/transmission controller 57 creates a command to lower transmission power by 1 dB using a transmission power control bit (TPC bit) and inputs the command to a CDMA transmitter 58. Conversely, if the receive SIR is smaller, the comparator/transmission controller 57 creates a command to raise transmission power by 1 dB using a transmission power control bit (TPC bit) and inputs the command to the CDMA transmitter 58.

The CDMA transmitter 58 inserts the TPC bit into transmit data and transmits the same to a mobile station. The mobile station regenerates the TPC bit sent from the base station and controls the transmission power by ±1 dB in accordance with the command. The receive SIR can be held constant by the foregoing control.

If the maximum fading pitch at which transmission power control follows up fading is calculated, the result will be 20 Hz. That is, the level generally fluctuates on the order of 30 to 40 dB owing to fading. Accordingly, on the assumption that fluctuation is ±40 dB, a TPC command is generated 1600 times in one second, i.e., 1/625 μs=1600, and 1 dB of control is performed each time. It is therefore possible for control to follow up fading of 1600/80=20 Hz.

(b) Control of Target SIR Based Upon Level Difference Between Paths

Since receive SIR is calculated by measuring the total power of all paths, the characteristic will not change depending upon the number of paths or the level differences between paths if fading is absent. If there is no fading, therefore, it is unnecessary to vary the target SIR. It is required that the target SIR be controlled depending upon the number of paths and level differences only when fading occurs. The reason for this is that when the level of a certain path falls owing to fading, the levels of other paths rise to make up for the fall but this effect depends upon the number of paths and the level differences between the paths. As a result, RAKE gain varies in accordance with the number of paths or the level differences between paths. In other words, the larger the number of paths and the smaller the level differences between paths, the higher the RAKE gain and the better the BER even at the same receive SIR, making it possible to lower the target SIR. Conversely, the smaller the number of paths and the larger the level differences between paths, the lower the RAKE gain and the worse the BER even at the same receive SIR, making it necessary to raise the target SIR.

A path level difference detector 55 detects the reception level differences between paths of multiple paths, a target-SIR correction unit 56 corrects the target SIR based upon the reception level differences between paths of multiple paths, and the comparator/transmission controller 57 compares the corrected target SIR (=$S_T'$) and the measured SIR (=S). If the receive SIR is greater, the comparator/transmission controller 57 creates a command to lower transmission power by 1 dB using a transmission power control bit (TPC bit) and inputs the command to the CDMA transmitter 58. Conversely, if the receive SIR is smaller, the comparator/transmission controller 57 creates a command to raise transmission power by 1 dB using a transmission power control bit (TPC bit) and inputs the command to the CDMA transmitter 58.

The CDMA transmitter 58 inserts the TPC bit into transmit data and transmits the same to the mobile station. The mobile station regenerates the TPC bit sent from the base station and controls the transmission power by ±1 dB in accordance with the command. The receive SIR can be held constant by the foregoing control.

(C) Control of Target SIR Based Upon Fading Pitch and Level Differences Between Paths The target-SIR correction unit 56 corrects the target SIR based upon both fading pitch and the reception level differences between paths of multiple paths, and the comparator/transmission controller 57 compares the corrected target SIR (=$S_T'$) and the measured SIR (=S). Based upon the magnitudes of these values, the comparator/transmission controller 57 creates a command to control transmission power by ±1 dB using a transmission power control bit (TPC bit) and inputs the command to the CDMA transmitter 58. The CDMA transmitter 58 inserts the TPC bit into transmit data and transmits the same to the mobile station. The mobile station regenerates the TPC bit sent from the base station and controls the transmission power by ±1 dB in accordance with the command. The receive SIR can be held constant by the foregoing control. In this case, a BER measurement unit (not shown) is provided for measuring the bit error rate BER, the target SIR output from the correction unit 56 is corrected further based upon the difference between the measured BER and a target BER, and the transmission power of the mobile station is controlled in such a manner that the measured SIR will agree with the corrected target SIR. Further, an FER measurement unit (not shown) is provided for measuring the frame error rate FER, the target SIR output from the correction unit 56 is corrected further based upon the difference between the measured FER and a target FER, and the transmission power of the mobile station is controlled in such a manner that the measured SIR will agree with the corrected target SIR.

Figure 2:
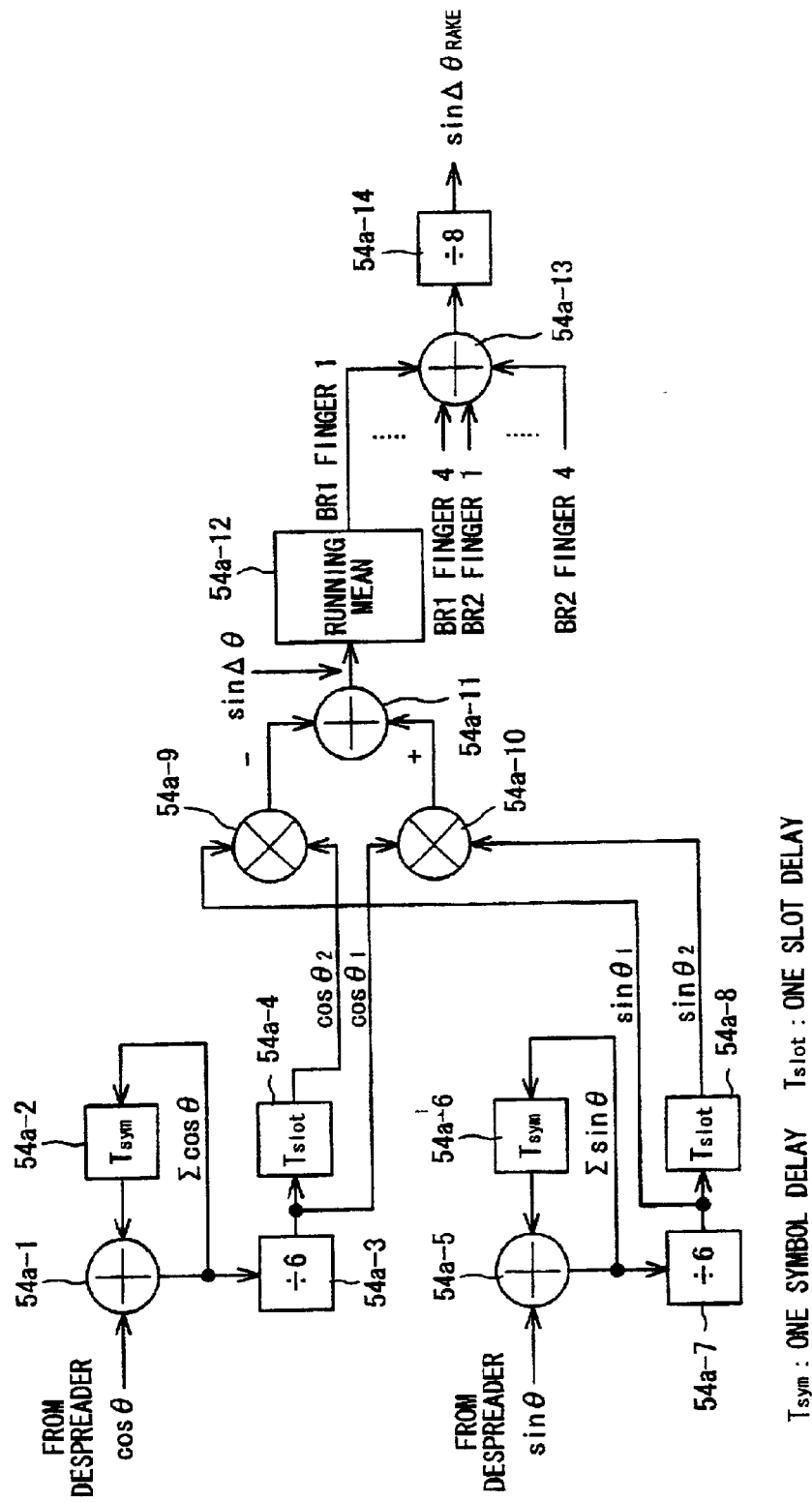
FIG. 2 shows a fading-pitch detection circuit that uses a pilot.

(B) Fading-Pitch Detection Circuit (a) Fading-Pitch Detection Circuit Using Pilot Signal FIG. 2 is a diagram showing the structure of a fading-pitch detection circuit that employs a pilot signal. Here cos θ represents an I-component of a pilot signal that is output from a despreader, and sin θ represents a Q-component of the pilot signal output from the despreader. This fading-pitch detection circuit makes the phase shift of one slot due to fading equal to $\Delta\theta(=\theta_2-\theta_1)$ and outputs the sine value of this as the fading pitch. The base station carries out AFC (Automatic Frequency Control) and, hence, there is no frequency shift in sending and receiving. This means that $\Delta\theta$ is a phase shift ascribable to fading. The values of cos θ, sin θ are averaged over one slot (six symbols/slot) and sin $\Delta\theta$ is calculated in accordance with the following equation:

$$\sin \Delta\theta = \sin(\theta_2-\theta_1) = \sin \theta_2 \cos \theta_1 - \cos \theta_2 \sin \theta_1 \quad (4)$$

After the running mean of this is calculated over several slots, the running means of all fingers/all branches are totaled and the average of this is output as sin $\Delta\theta_{RAKE}$, which conforms to the fading pitch.

Specifically, an adder circuit 54*a*-1 adds the presently prevailing cos θ and the sum Σcos θ, up to the immediately preceding cos θ, delayed by one symbol by a delay circuit 54*a*-2. An average calculation unit 54*a*-3 obtains the average value of cos θ over one slot by taking one-sixth of the total value Σcos θ over one slot and outputs cos $\theta_1$ of the present slot, and a delay circuit 54*a*-4 delays cos $\theta_1$ by one slot and outputs cos $\theta_2$ of the preceding slot.

An adder circuit 54*a*-5 adds the presently prevailing sin θ and the sum Esin θ, up to the immediately preceding sin θ, delayed by one symbol by a delay circuit 54*a*-6. An average calculation unit 54*a*-7 obtains the average value of sinθ over one slot by taking one-sixth of the total value Σsin θ over one slot and outputs sin $\theta_1$ of the present slot, and a delay circuit 54*a*-8 delays sin $\theta_1$ by one and outputs sin $\theta_2$ of the preceding slot.

Multipliers 54*a*-9, 54*a*-10 and an adder circuit 54*a*-11 perform the operation of Equation (4) to calculate sin $\Delta\theta$, a running-mean calculation unit 54*a*-12 calculates the running mean over several slots, an adder circuit 54*a*-13 totals the eight running means output from the four fingers/two branches (a total or eight fingers), and an average calculation unit 54*a*-14 divides the sum total by eight to calculate sin $\Delta\theta_{RAKE}$ and output the same as the fading pitch.

(b) Fading-Pitch Detection Circuit Using Receive SIR

Figure 3:
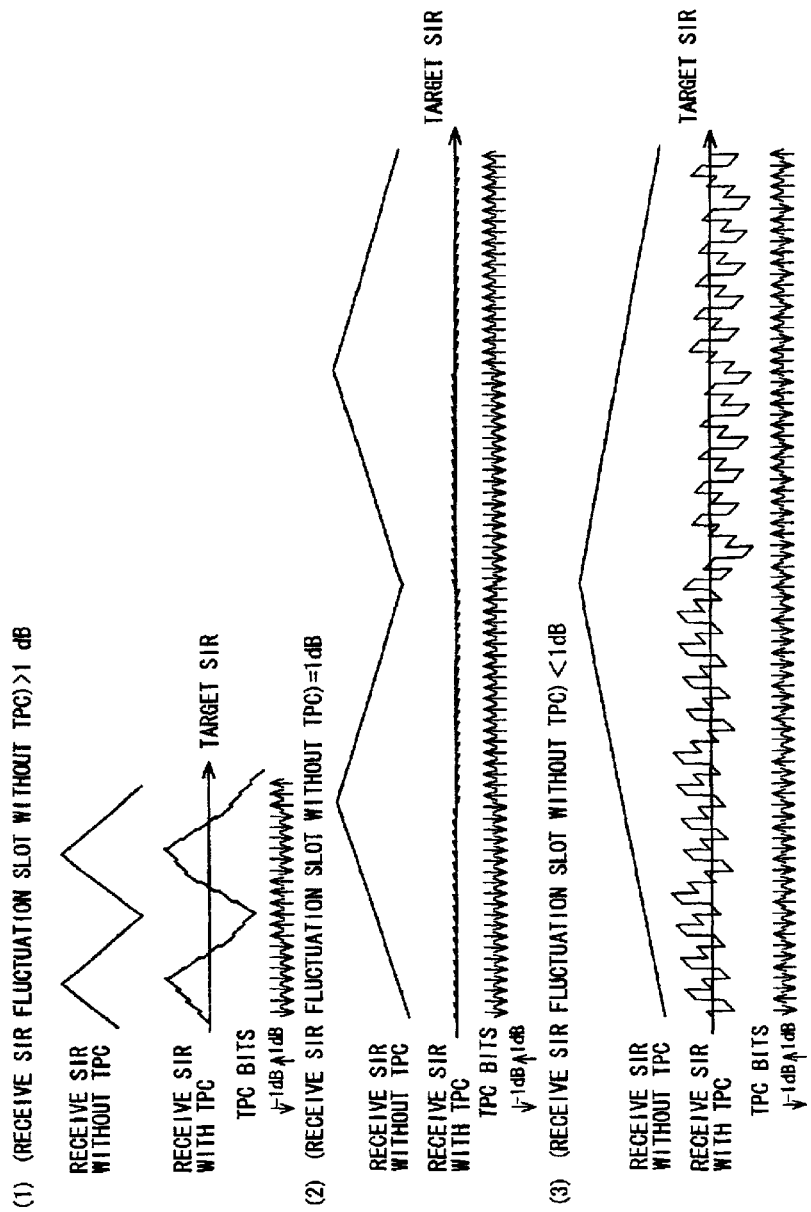
FIG. 3 is a diagram useful in describing the relationship among fading pitch, receive SIR and TPC bit.

FIG. 3 is a diagram illustrating the relationship among fading pitch, receive SIR and a TPC bit. In FIG. 3, receive SIR in the absence of transmission power control (TPC), receive SIR when transmission power control (TPC) is applied and the direction of transmission power control in units of 1 dB based upon a TPC bit (command) are indicated at (1) to (3). Transmission power control is carried out slot by slot. An up arrow signifies 1 dB up and a down arrow signifies 1 dB down.

In FIG. 3, (1) illustrates a case where the fluctuation of receive SIR in one slot when transmission power control (TPC) is not being performed is larger than 1 dB, (2) illustrates a case where the fluctuation of receive SIR in one slot when transmission power control (TPC) is not being performed is equal to 1 dB, and (3) illustrates a case where the fluctuation of receive SIR in one slot when transmission power control (TPC) is not being performed is less than 1 dB. Receive SIR decreases if fading increases and increases if fading decreases. Accordingly, the change in receive SIR when TPC is not being carried out represents the inverse of the fading characteristic at radio frequency.

In (1) of FIG. 3, the change in fading is so fast that slot-by-slot transmission power control cannot keep up. As a consequence, receive SIR prevailing when transmission power control is being carried out is such that the fluctuation in its amplitude is reduced somewhat in comparison with when transmission power control is not being carried out, but the fluctuation is not eliminated. In (2) of FIG. 3, the fluctuation in receive SIR when transmission power control is not being carried out is 1 dB/slot, which is the same as the speed of transmission power control based upon the TPC bits. Accordingly, if TPC bits perform control continuously in the same direction, the receive SIR is rendered substantially constant by transmission power control. In (3) of FIG. 3, the rate of change in fading is slow in comparison with (2) and is less than 1 dB/slot. As a consequence, control by the TPC bits is excessive. As receive SIR in the absence of transmission power control increases, the number of times 1-dB-down control is performed becomes greater than the number of times 1-dB-up control is performed. Conversely, as receive SIR in the absence of transmission power control decreases, the number of times 1-dB-up control is performed becomes greater than the number of times 1-dB-down control is performed. It should be noted that the plot along the vertical axis in (3) in FIG. 3 has been enlarged to make it easier to see the fluctuation in receive SIR in a case where transmission power control is applied.

Thus, the change in receive SIR and the fluctuation in the direction of transmission power control due to the TPC bits each depend upon the fading pitch. These can therefore be utilized in detection of fading pitch.

Figure 4:
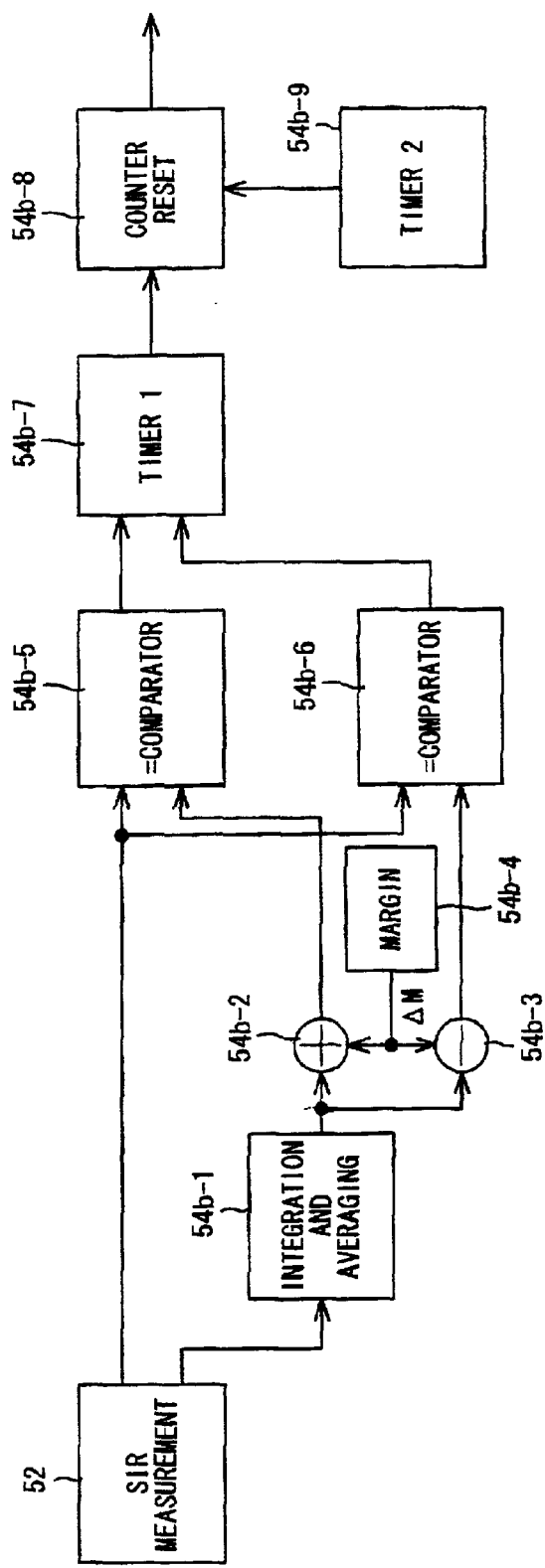
FIG. 4 shows a fading-pitch detection circuit that uses a SIR.

FIG. 4 is a block diagram showing a fading-pitch detection circuit for detecting fading pitch based upon a change in receive SIR. This circuit obtains the average value of receive SIR, detects the number of times the receive SIR crosses this average value in a prescribed period of time and adopts this as the fading pitch. The SIR measurement unit 52 estimates the SIR of the receive signal, an integrating/averaging circuit 54*b*-1 integrates the result of SIR measurement and calculates the average value thereof, and adder circuits 54*b*-2, 54*b*-3 add and subtract a margin $\Delta M$, which is output from a margin generating circuit 54*b*-4, to and from the average value and input the results to comparator circuits 54*b*-5, 54*b*-6. The comparator circuits 54*b*-5, 54*b*-6 compare the receive SIR and (average SIR $\pm\Delta M$) in terms of magnitude and input a high-level comparison result to a timer 54*b*-7 if the receive SIR is larger and a low-level comparison result to the timer 54*b*-7 if the receive SIR is smaller.

If the output of either of the two comparators 54*b*-5, 54*b*-6 changes to "1" within a prescribed period of time, the timer 54*b*-7 construes that the measured SIR has crossed the average value and outputs a count pulse to a counter 54*b*-8. By counting the pulses, the counter 54*b*-8 counts the number of times the level is crossed within the fixed period of time. The value of the count is the fading pitch. A timer 54*b*-9 resets the value of the count in the counter at the fixed time interval.

With the fading-pitch detection circuit of FIG. 4, the margin $\Delta M$ is added to and subtracted from the average SIR.

If the measured SIR exceeds both levels (average SIR ±ΔM) or falls below both of these levels, it is judged that the average level has been crossed. Accordingly, the counter 54b-8 does not count even if the measured SIR fluctuates in the vicinity of the average value. The counter therefore counts the correct number of crossings and can detect the fading pitch accurately.

(c) Fading-Pitch Detection Circuit Using TPC Bit

Figure 5:
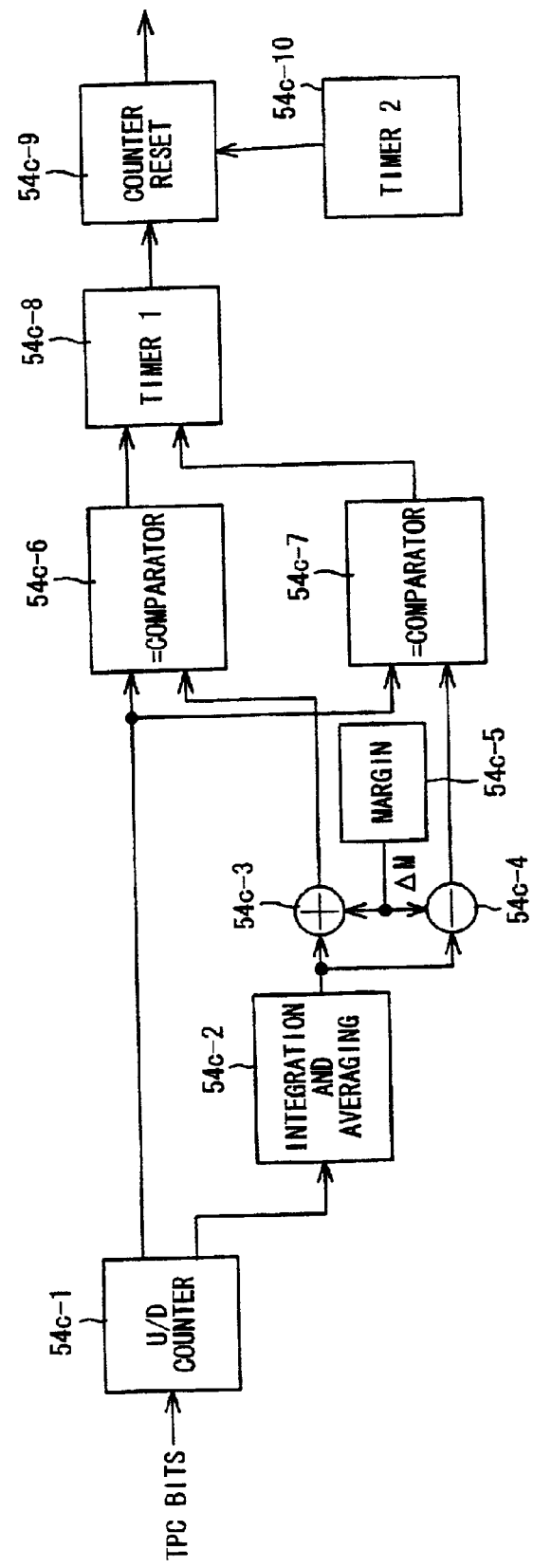
FIG. 5 shows a fading-pitch detection circuit that uses a TPC bit.

FIG. 5 is a block diagram showing a fading-pitch detection circuit that employs the TPC bit. An up/down counter 54c-1 counts up TPC bits in the 1-dB-up direction and counts down TPC bits in the 1-dB-down direction. An integrating/averaging circuit 54c-2 integrates the value of the count in up/down counter 54c-1, calculates the average value of the count in counter 54c-1 over a plurality of slots and outputs the average value. Adder circuits 54c-3, 54c-4 add and subtract a margin ΔM, which is output from a margin generating circuit 54c-5, to and from the average value and input the results to comparator circuits 54c-6, 54c-7. The comparator circuits 54c-6, 54c-7 compare the count in the up/down counter 54c-1 and (average SIR ±ΔM) in terms of magnitude and input a high-level comparison result to a timer 54c-8 if the count is larger and a low-level comparison result to the timer 54c-8 if the count is smaller.

If the output of either of the two comparators 54c-6, 54c-7 changes to "1" within a prescribed period of time, the timer 54c-8 construes that the count in the up/down counter 54c-1 has crossed the average value and outputs a count pulse to a counter 54c-9. By counting the pulses, the counter 54c-9 counts the number of times the average level is crossed within the fixed period of time. The value of the count is the fading pitch. A timer 54b-9 resets the value of the count in the counter 54c-9 at the fixed time interval.

With the fading-pitch detection circuit of FIG. 5, the margin ΔM is added to and subtracted from the average count. If the counted value exceeds both levels (average count ±ΔM) or falls below both of these levels, it is judged that the average level has been crossed. Accordingly, the counter 54c-9 does not count even if the counted value in up/down counter 54c-1 fluctuates in the vicinity of the average value. The counter therefore counts the correct number of crossings and can detect the fading pitch accurately.

Figure 6:
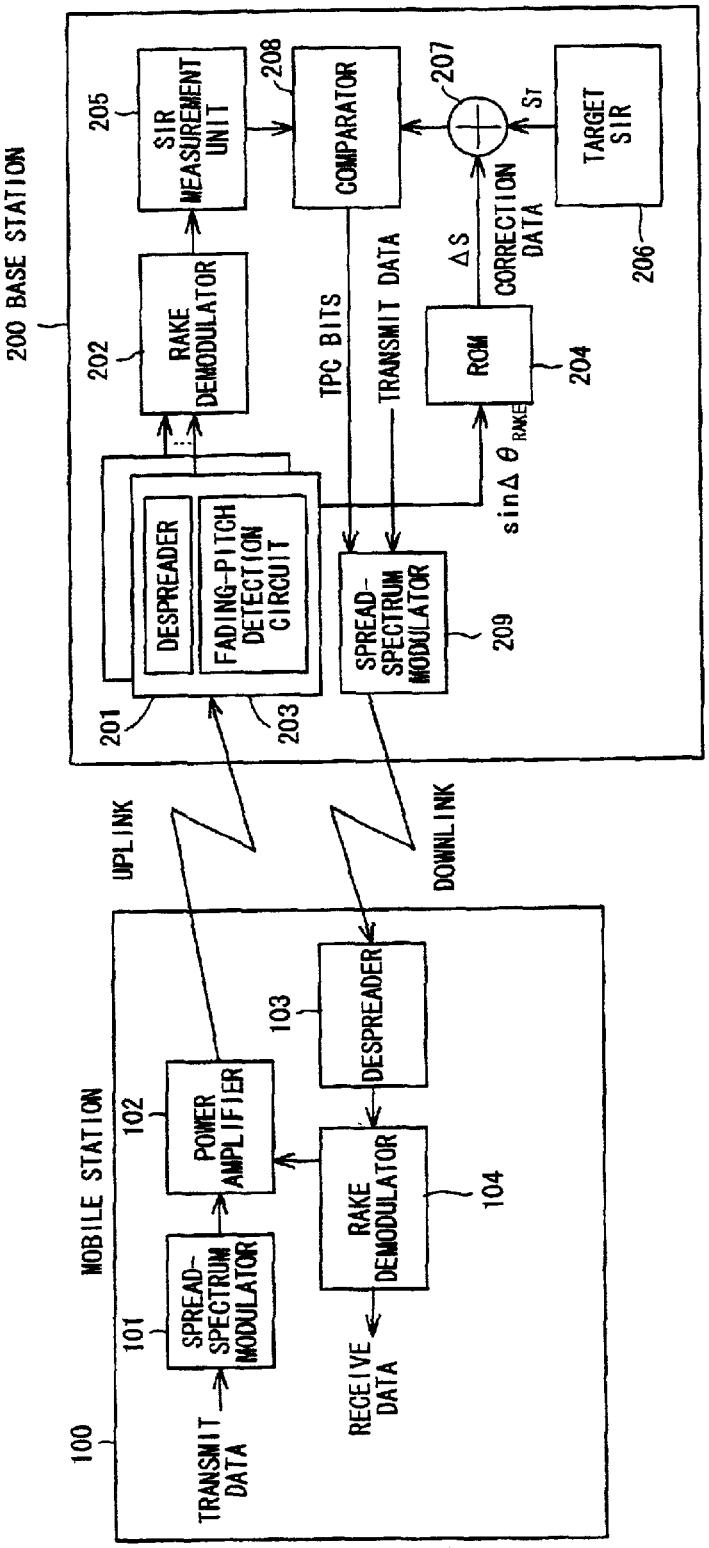
FIG. 6 illustrates an embodiment of transmission power control for correcting a target SIR by a fading pitch detected using a pilot.

(C) Transmission Power Control for Correcting Target SIR by Fading Pitch (a) First Embodiment FIG. 6 illustrates a first embodiment of transmission power control for correcting a target SIR by a fading pitch detected using a pilot signal.

A mobile station 100 includes a spread-spectrum modulator 101 for spread-spectrum modulating transmit data using a spreading code conforming to a prescribed channel specified by a base station, and a power amplifier 102 for amplifying a signal, which is input thereto following processing such as quadrature modulation and frequency conversion applied after spread-spectrum modulation, and transmitting the amplified signal to a base station 200 from an antenna.

The base station 200 subjects the receive signal from the mobile station to a frequency conversion (RF→IF conversion), quadrature detection and AD conversion processing and inputs the AD-converted output to a despreader 201 of a finger conforming to each path of multiple paths. The despreader 201 subjects a delayed signal that arrives via an assigned path to despread processing. A RAKE demodulator 202 combines the signals output from the fingers, subjects the combined signal to maximal ratio combining at a weighting conforming to the reception power of each branch, and discriminates "1"s and "0"s of the receive data based upon the maximal-ratio combination signal.

A fading-pitch detection circuit 203, which has the structure shown in FIG. 2, detects the fading pitch $\sin\Delta\theta_{RAKE}$ every slot using the pilot signal (It=cos θ, Qt=sin θ). The correspondence between $\sin \Delta\theta_{RAKE}$ and correction data ΔS of the target SIR has been written to a ROM 204 in advance. More specifically, before the apparatus is placed in operation, fading is varied and the correction data ΔS of a target SIR for which the desired BER is obtained is found with respect to the fading pitch $\sin \Delta\theta_{RAKE}$. This is repeated in similar fashion to obtain the correspondence between a large number of values of $\sin \Delta\theta_{RAKE}$ and the correction data ΔS and the correspondence is burned into the ROM 204. As a result, when $\sin \Delta\theta_{RAKE}$ enters the ROM 204 from the fading-pitch detection circuit 203, the correspondence correction data ΔS is read out of the ROM and is input to a target-ROM correction unit 207.

A SIR measurement unit 205 measures the power ratio (SIR) between the receive signal (Signal) and an interference signal (Interference), which includes thermal noise, and a target-SIR setting unit 206 sets the target SIR ($=S_T$) in such a manner that the desired BER (e.g., $10^{-3}$) will be obtained by transmission power control.

A target-SIR correction unit 207 adds correction data ΔS, which is output from the ROM 204, to the target SIR ($=S_T$) to effect a correction in accordance with the following equation:

$$S_T + \Delta S \rightarrow S_T \quad (5)$$

A comparator 208 compares the corrected target SIR with the measured SIR, creates a command which lowers the transmission power using a TPC bit if the measured SIR is greater than the target SIR, and creates a command to raise the transmission power using the TPC bit if the measured SIR is less than the target SIR. A spread-spectrum modulator 209 spread-spectrum modulates the transmit data and TPC bits. After spread-spectrum modulation, the base station 200 executes processing such as DA conversion, quadrature modulation, frequency conversion and power amplification and transmits the results to the mobile station 100 from an antenna. A despreader 103 in the mobile station 100 applies despread processing to the signal received from the base station 200, and a RAKE demodulator 104 demodulates the receive data and TPC bits and controls the transmission power of the power amplifier 102 in accordance with a command specified by the TPC bit.

(b) Second Embodiment

Figure 7:
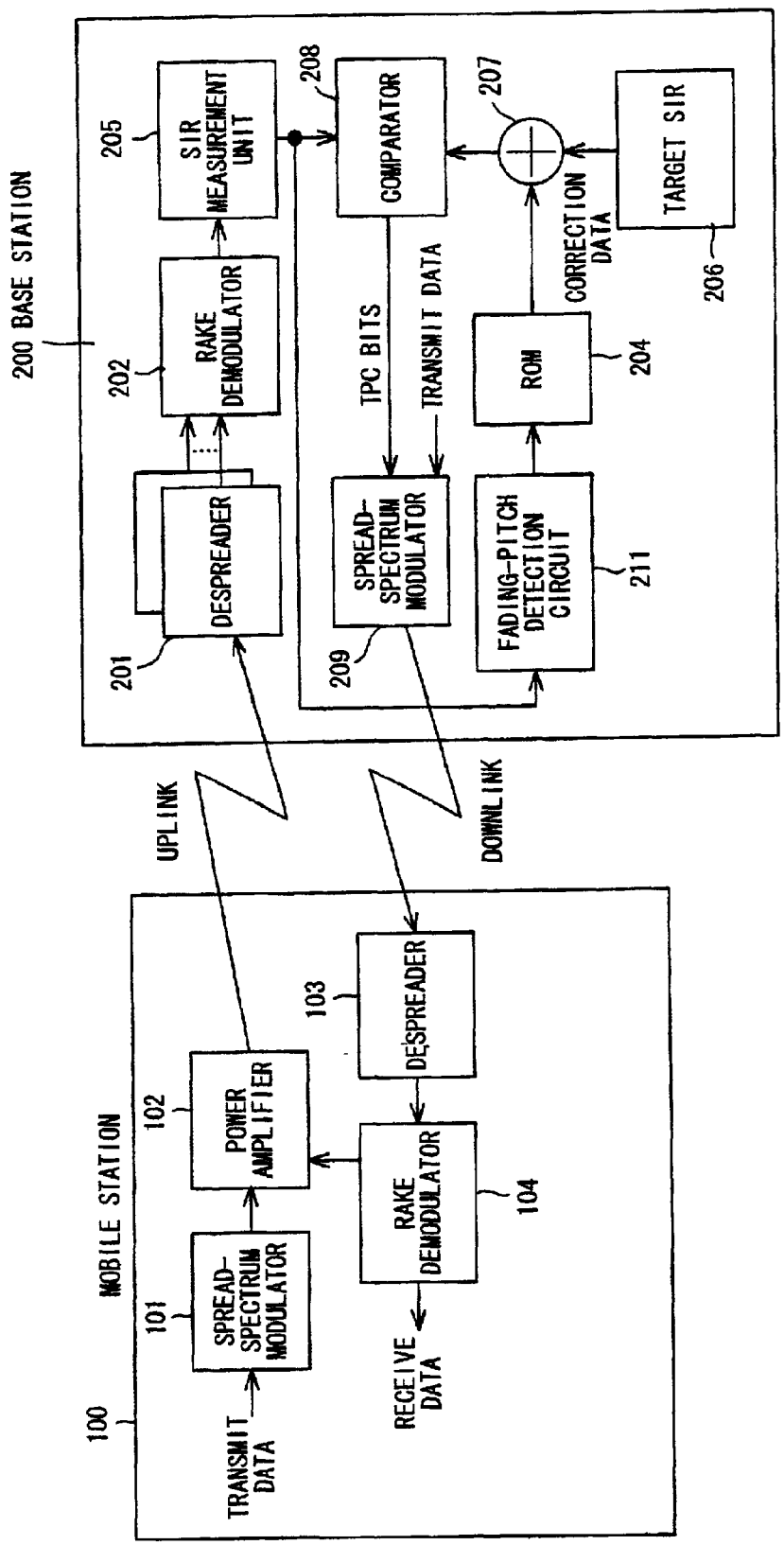
FIG. 7 illustrates an embodiment of transmission power control for correcting a target SIR by a fading pitch detected using a SIR.

FIG. 7 illustrates a second embodiment of transmission power control for correcting a target SIR by fading pitch detected using SIR. Components identical with those of the first embodiment shown in FIG. 6 are designated by like reference characters. This embodiment differs in that:

(1) Fading pitch is detected by a fading-pitch detection circuit 211, which is shown in FIG. 4, using received SIR.

(2) Before the apparatus is placed in operation, fading is varied, fading pitch is measured by the fading-pitch detection circuit 211 and the correction data ΔS of a target SIR for which the desired BER is obtained is found with respect to the fading pitch. This is repeated in similar fashion to obtain the correspondence between a large number of values of fading pitch and the correction data and the correspondence is burned into the ROM 204.

Transmission power control is carried out in a manner similar to that of the first embodiment.

(c) Third Embodiment

Figure 8:
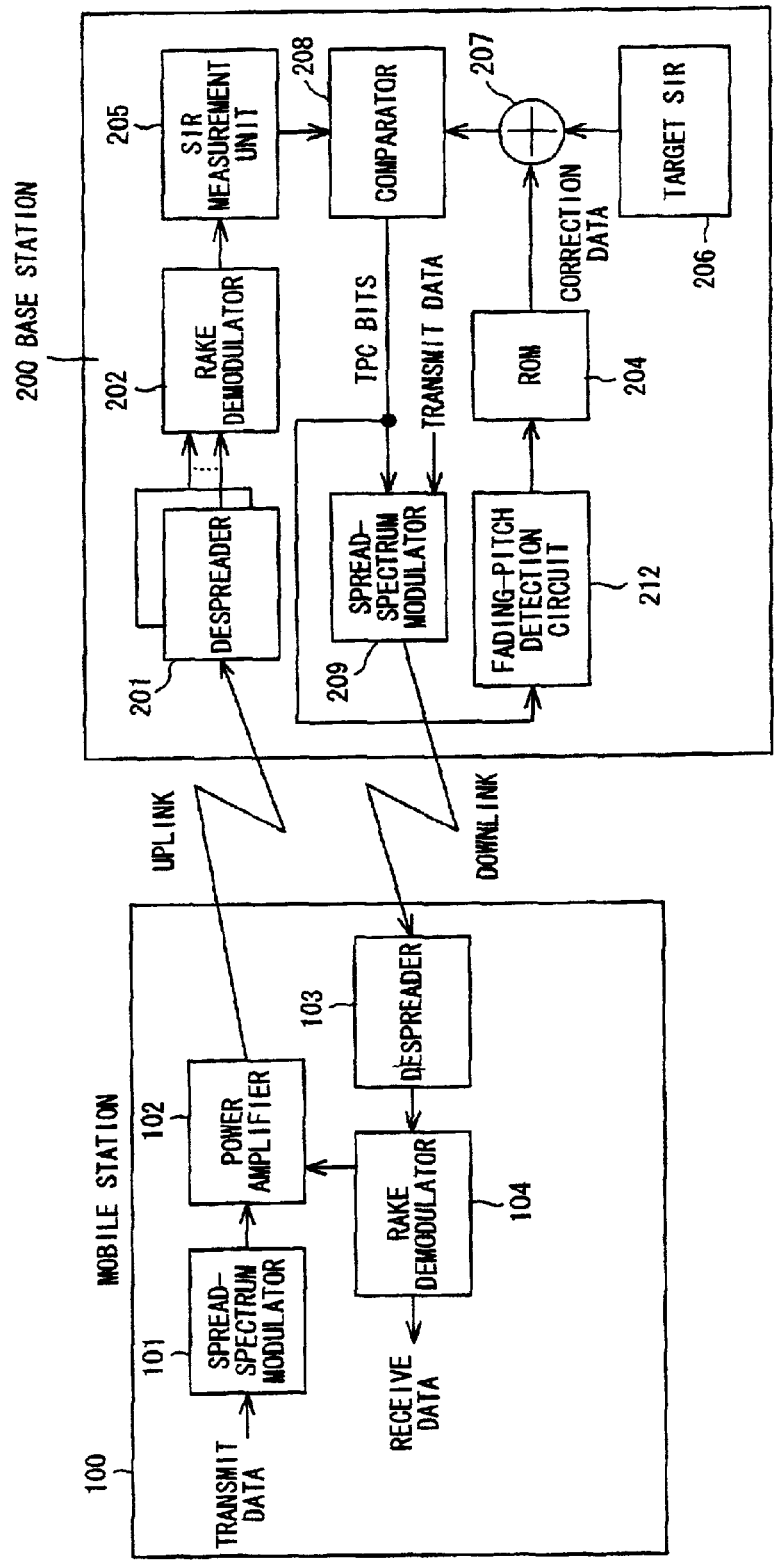
FIG. 8 illustrates an embodiment of transmission power control for correcting a target SIR by a fading pitch detected using a TPC bit.

FIG. 8 illustrates a third embodiment of transmission power control for correcting a target SIR by fading pitch detected using a change in the transmission power control direction of TPC bits. Components identical with those of the first embodiment shown in FIG. 6 are designated by like reference characters. This embodiment differs in that:

(1) Fading pitch is detected by a fading-pitch detection circuit 212, which is shown in FIG. 5, on the basis of a change in direction of power transmission control.

(2) Before the apparatus is placed in operation, fading is varied, fading pitch is measured by the fading-pitch detection circuit 212 and the correction data ΔS of a target SIR for which the desired BER is obtained is found with respect to the fading pitch. This is repeated in similar fashion to obtain the correspondence between a large number of values of fading pitch and the correction data and the correspondence is burned into the ROM 204.

Transmission power control is carried out in a manner similar to that of the first embodiment.

(D) Path-to-Path Level Difference Detection Circuit

Figure 9:
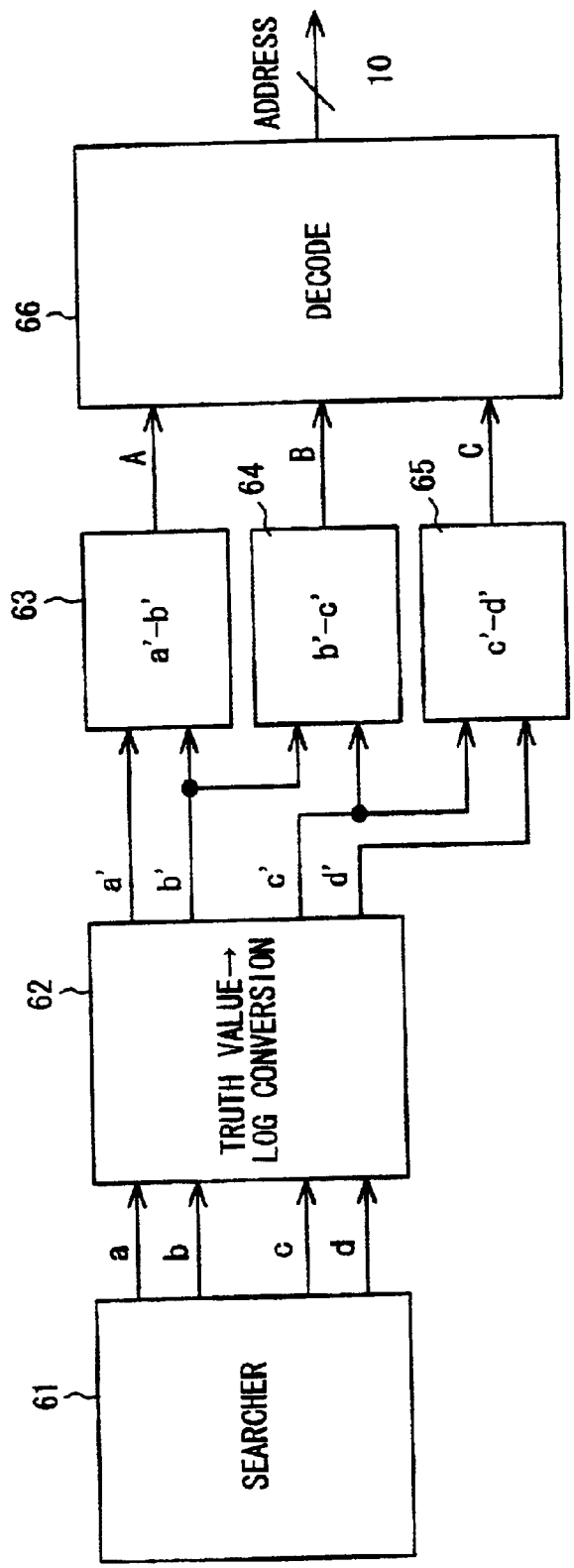
FIG. 9 shows a path level difference detection circuit.

FIG. 9 is a block diagram showing a path detection and path-to-path level difference detection circuit. Here each branch is provided with one searcher 61 that creates a delay profile by performing an autocorrelation operation using a matched filter (not shown), detects multipath based upon the peak levels of the delay profile, and inputs despreading-start timing data and delay-time adjustment data of the respective paths to the fingers. Further, if one branch has four fingers, then the searcher 61 outputs the reception levels of the four paths constituting multipath as a, b, c, d in order of decreasing size. The path for which the reception level is maximum is path 1, the path having the next highest reception level is path 2, and so on for paths 3 and 4. Path 1 is referred to as the main path. A logarithmic converter 62 subjects the reception level of each path to a truth value→log conversion in order to execute processing upon providing a threshold value in dB.

A level-difference calculation unit 63 calculates a level difference A (a'−b') between the main path 1 and path 2, a level-difference calculation unit 64 calculates a level difference B (b'−c') between path 2 and path 3, and a level-difference calculation unit 65 calculates a level difference C (c'−d') between path 3 and path 4. If the level difference with respect to the main path is 15 dB or greater, then it is considered that there is almost no deterioration in characteristic even if the level difference is regarded as 15 dB. Accordingly, if the level of the receive signal is lower than a maximum reception level Lmax by 15 dB or more, then the level difference is regarded as 15 dB and the level of the receive signal is made (Lmax−15). If this expedient is adopted, 815 combinations of levels A, B, C exist, as shown in FIGS. 10 and 11, where FIG. 10 illustrates the initial 43 combinations and FIG. 11 illustrates the final 45 combinations. The combinations are distinguished from one another by addresses 0 to 814.

A decoder 66 incorporates the decoding table of FIGS. 10, 11 and outputs, in a form expressed by ten bits, addresses conforming to the combinations of levels A, B, C that enter from each of the level-difference calculations units 63 to 65. As a result, the decoder can specify the level differences between paths.

Figure 12:
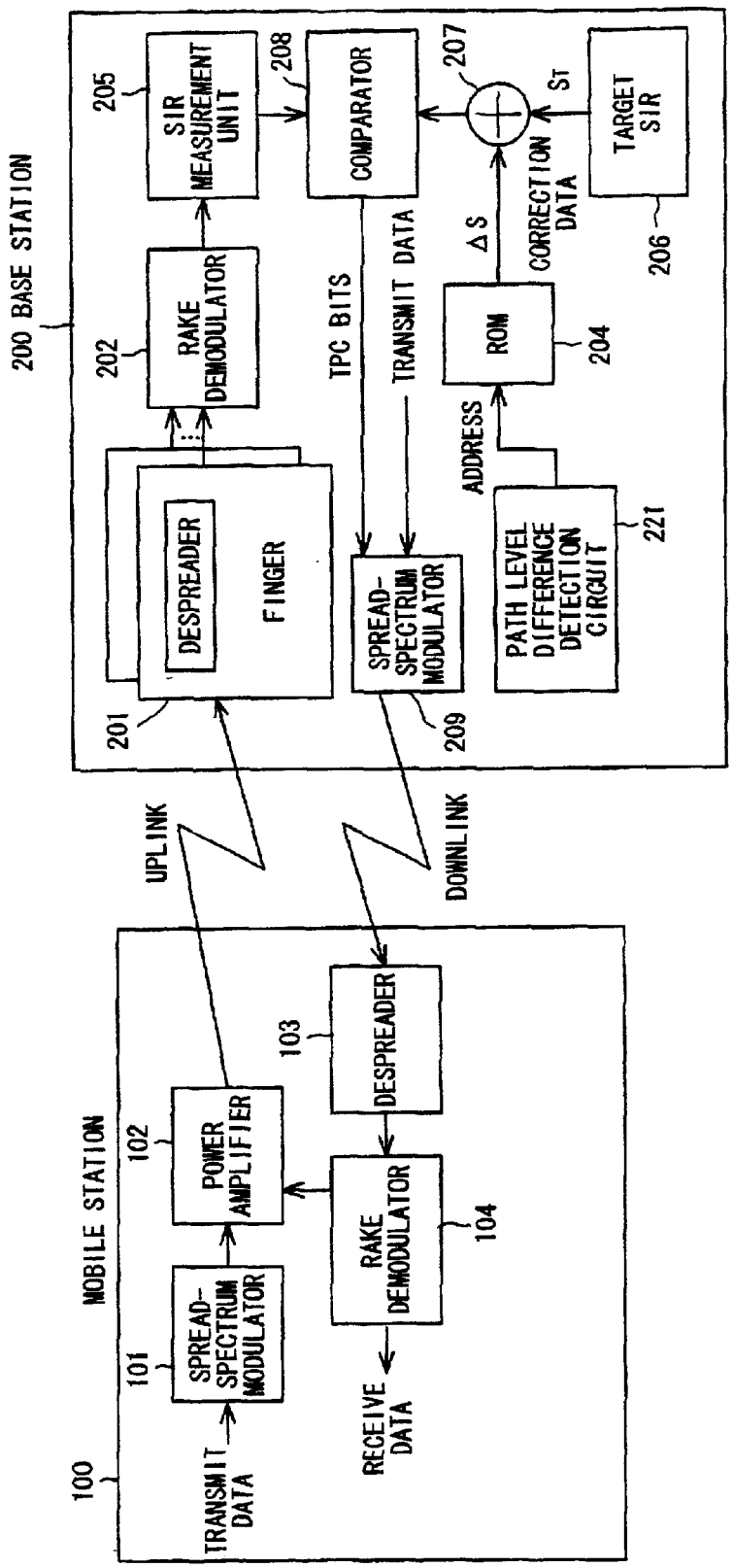
FIG. 12 illustrates an embodiment of transmission power control for correcting a target SIR by a level difference between paths.

(E) Transmission Power Control for Correcting Target SIR by Level Difference Between Paths FIG. 12 shows an embodiment of transmission power control for correcting a target SIR by level differences between paths. Components identical with those of the embodiment of FIG. 6 are designated by like reference characters. This embodiment differs from that of FIG. 6 in that transmission power control is performed based upon the level differences between paths and not fading pitch.

The correspondence between combinations of level differences A, B, C between paths and target-SIR correction data ΔS is stored in the ROM 204 beforehand. That is, before the apparatus is placed in operation, the level differences A, B, C between paths are varied, the correction data ΔS of a target SIR that make the desired BER possible is obtained and the correction data ΔS is stored at the address conforming to each level difference between paths.

When transmission power control is carried out, a path level difference detection circuit 221 (see FIG. 9) arranges the reception levels of each of the paths in order of decreasing size, calculates the level differences A, B, C between mutually adjacent reception levels and generates addresses conforming to the combinations of the level differences A, B, C. When an address conforming to level differences between paths is input to the ROM 204 from the path level difference detection circuit 221, the correction data ΔS is read out of the ROM from this address and is input to the target-SIR correction unit 207. Transmission power control similar to that of FIG. 6 is then carried out.

(F) Transmission Power Control for Correcting Target SIR by Fading Pitch and Level Differences Between Paths The embodiments described above relate to cases where transmission power control is performed upon correcting target SIR based on fading pitch and based on level differences between paths. However, it is also possible to adopt an arrangement in which transmission power control is carried out upon correcting target SIR taking both fading pitch and level differences into consideration.

Figure 13:
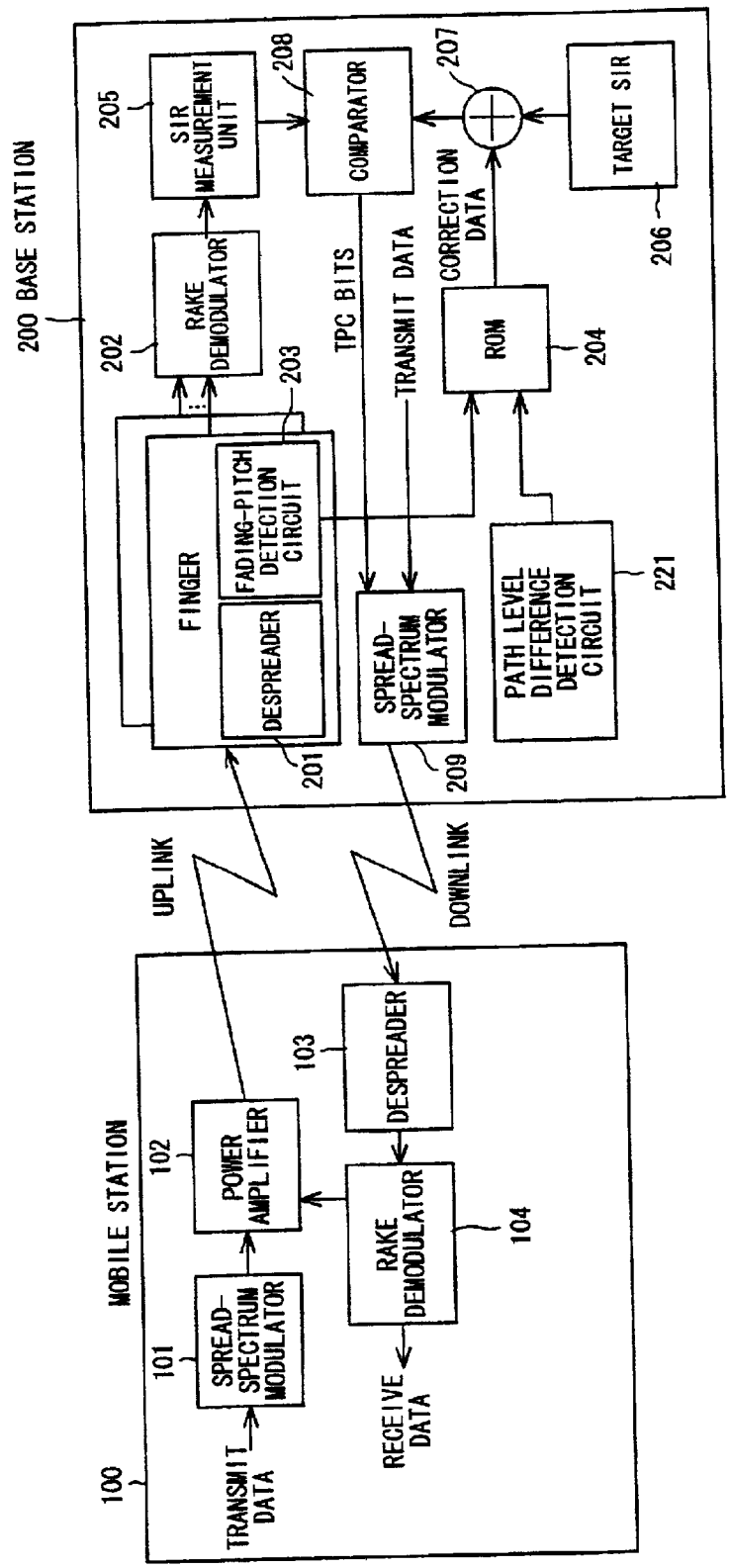
FIG. 13 illustrates a first embodiment of transmission power control for correcting a target SIR by fading pitch and level differences between paths.

FIG. 13 illustrates an embodiment in which transmission power control is carried out upon correcting a target SIR taking both fading pitch and level differences between paths into consideration. Components identical with those of FIGS. 6 and 12 are designated by like reference characters.

Correction data ΔS conforming to combinations of level differences between paths and fading pitch is stored in the ROM 204 beforehand. That is, level differences between paths are varied in accordance with the decoding table of FIGS. 10, 11 at a prescribed fading pitch, the correction data ΔS of a target SIR that make the desired BER possible is obtained at each level difference between paths, and the correction data ΔS is stored at the ROM address conforming to each combination of level differences between paths and fading pitch. Fading pitch and the level differences between paths are varied similarly and correction data ΔS is stored at all addresses conforming to combinations of level differences between paths and fading pitch.

When transmission power control is carried out, the fading-pitch detection circuit 203 (see FIG. 2) detects fading pitch using the pilot signal. Further, the path level difference detection circuit 221 (see FIG. 9) arranges the reception levels of each of the paths in order of decreasing size, calculates the level differences A, B, C between mutually adjacent reception levels and generates addresses conforming to the combinations of the level differences A, B, C. As a result, the correction data ΔS is read out of the ROM 204 from a storage area designated by the fading pitch and an address that corresponds to the level differences between paths, and the correction data is input to the target-SIR correction unit 207. Transmission power control similar to that of FIG. 6 is then carried out.

First Modification

Figure 14:
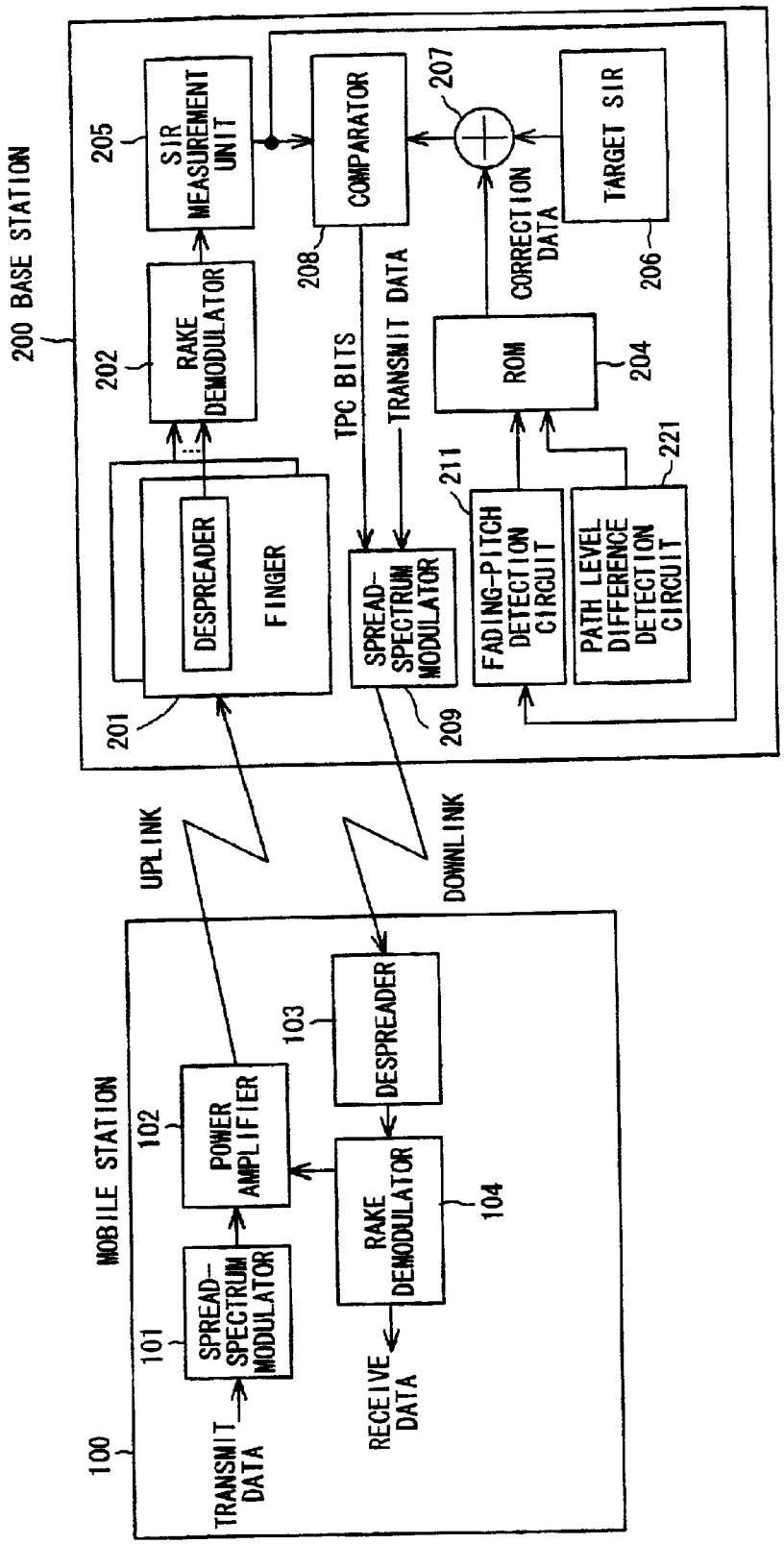
FIG. 14 illustrates a second embodiment of transmission power control for correcting a target SIR by fading pitch and a level differences between paths.

In the embodiment of FIG. 13, fading pitch is detected using the pilot signal. However, it can be so arranged that fading pitch is detected using receive SIR. FIG. 14 is a block diagram of such a modification. This differs from the embodiment of FIG. 13 in that the fading-pitch detection circuit 211 (see FIG. 4) is provided to detect fading pitch based upon receive SIR. Transmission power control is the same as that of the embodiment of FIG. 16.

Second Modification

Figure 15:
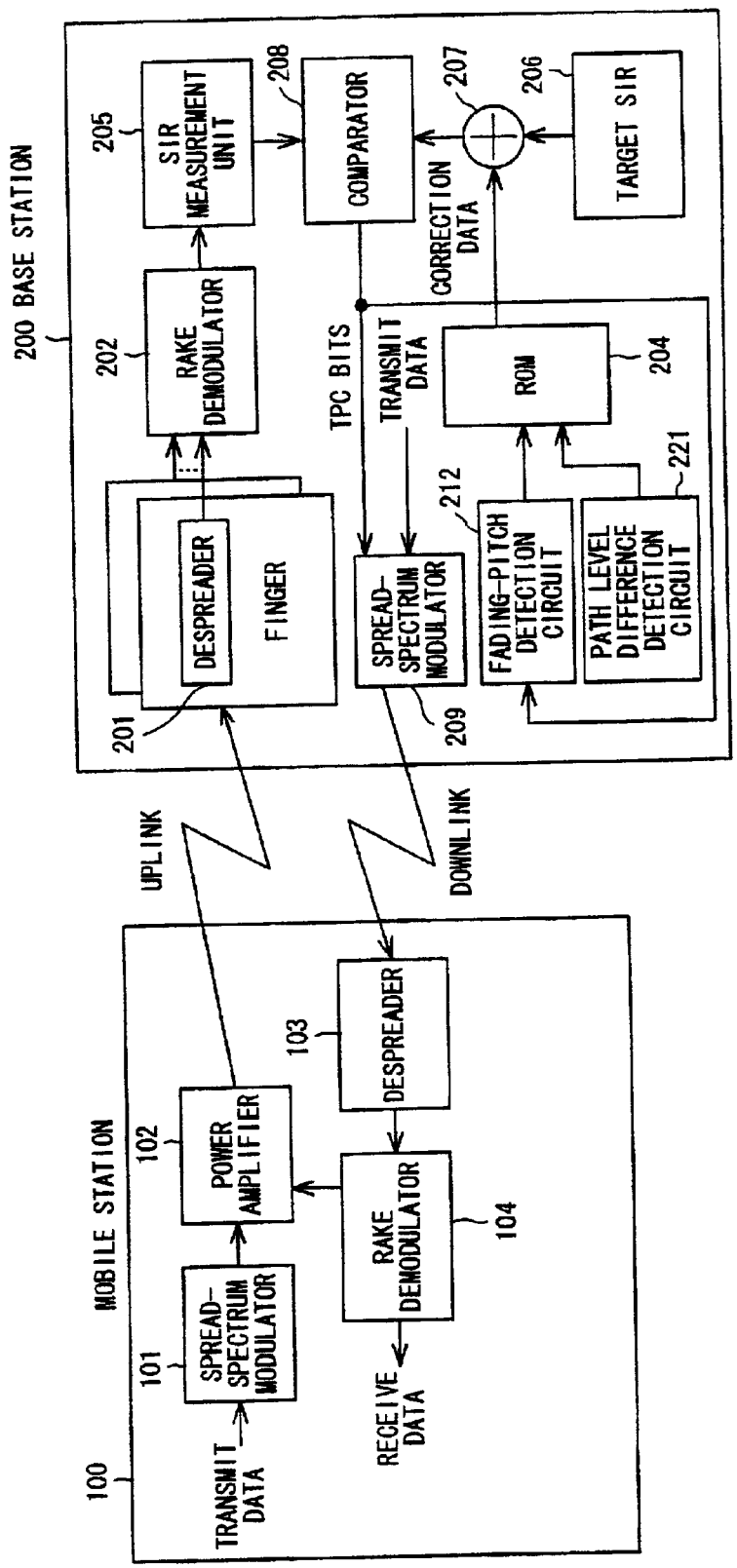
FIG. 15 illustrates a third embodiment of transmission power control for correcting a target SIR by fading pitch and a level difference between paths.

In the embodiment of FIG. 13, fading pitch is detected using the pilot signal. However, it can be so arranged that fading pitch is detected using a change in the power control direction of TPC bits. FIG. 15 is a block diagram of such a modification. This differs from the embodiment of FIG. 13 in that the fading-pitch detection circuit 212 (see FIG. 5) is provided to detect fading pitch based upon a change in the transmission power control direction of TPC bits. Transmission power control is the same as that of the embodiment of FIG. 16.

Figure 16:
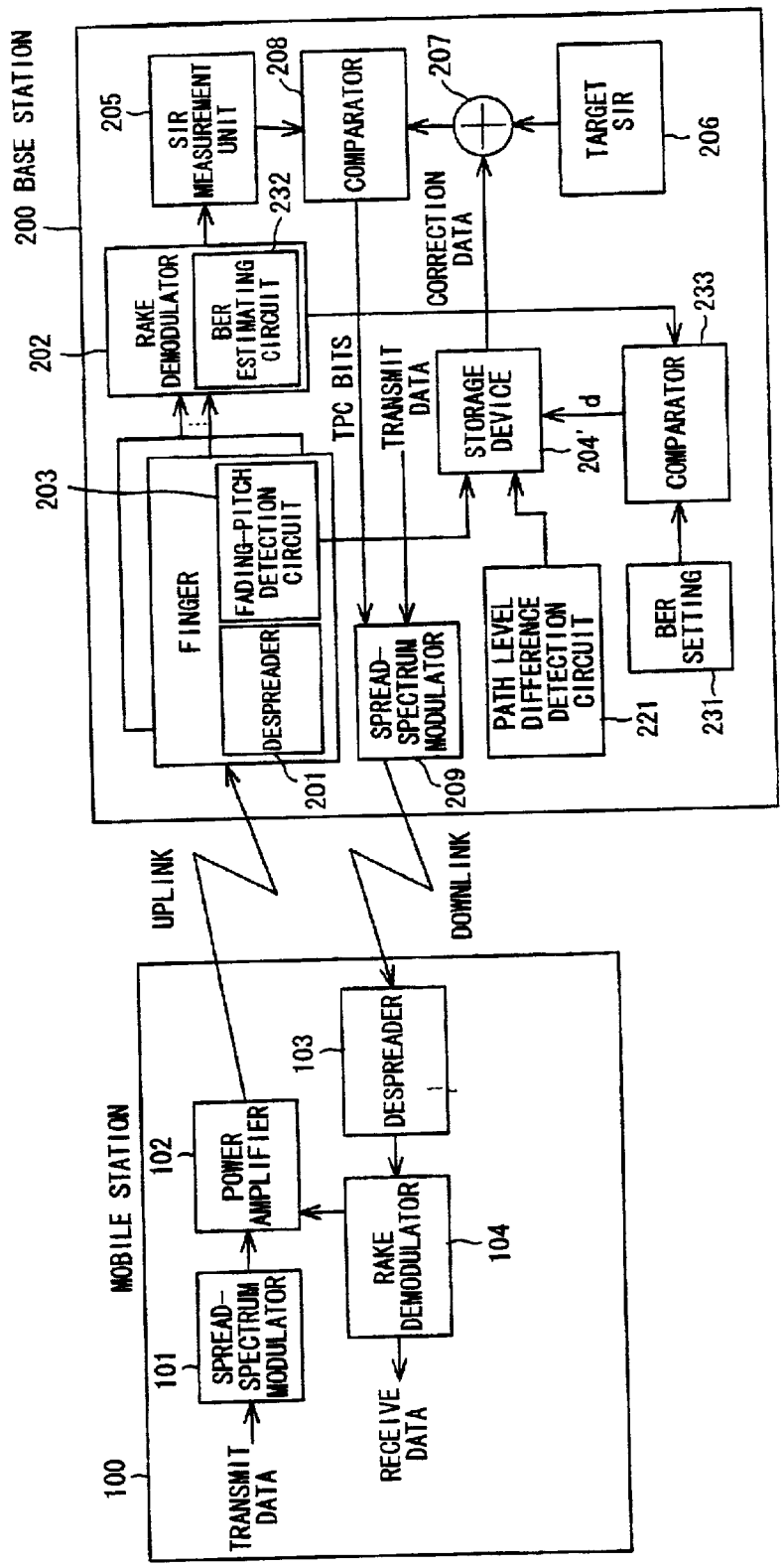
FIG. 16 illustrates an embodiment of transmission power control for correcting a target SIR based upon fading pitch, level differences between paths and an estimated value of BER.

(G) Transmission Power Control for Correcting Target SIR by Difference Between Measured BER and Set BER FIG. 16 illustrates an embodiment for correcting a target SIR based upon fading pitch, level differences between paths and a difference between measured BER and target BER. Components identical with those shown in FIG. 13 are designated by like reference characters. This embodiment differs in that:

(1) correction data is stored in a rewritable storage device 204' rather than a ROM;

(2) a BER setting unit 231 sets a BER, which prevails prior to error correction, such that the BER after error correction will attain a desired value, e.g., $10^{-3}$;

(3) a BER estimating circuit 232 measures the actual BER prior to error correction; and (4) on the basis of the difference between the set BER and estimated BER, a comparator 233 updates the value of correction data that has been stored in the storage device 204' and inputs the updated data to the correction unit 207.

The correction data is initially set in the storage device 204' by a method identical with that of FIG. 13. When transmission power control is performed, the fading-pitch detection circuit 203 (see FIG. 2) detects fading pitch using the pilot signal and inputs the fading pitch to the storage device 204'. Further, the path level difference detection circuit 221 (see FIG. 9) arranges the reception levels of each of the paths in order of decreasing size, calculates the level differences A, B, C between mutually adjacent reception levels and inputs addresses conforming to the combinations of the level differences A, B, C to the storage device 204'.

In parallel with the foregoing, the BER estimating circuit 232 estimates the BER that prevails prior to error correction and inputs this BER to the comparator 223. The comparator 223 calculates a difference d between the set BER and estimated BER and inputs this difference to the storage device 204'. The correction data ΔS is read out of the storage device 204' from a storage area designated by a combination of the fading pitch and an address that corresponds to the level differences between paths, the correction data is increased or decreased in value based upon the difference d between set BER and estimated BER, the old data is updated by the correction data after the increase or decrease in value, and the corrected data after updating is input to the target-SIR correction unit 207. Transmission power control similar to that of FIG. 6 is then carried out and the BER after the error correction is maintained at $10^{-3}$. It should be noted that if the estimated BER is worse than the set BER, correction data in the storage device 204' is updated so as to increase the value. If the estimated BER is better than the set BER, correction data in the storage device 204' is updated so as to decrease the value. The updated data is input to the target-SIR correction unit 207.

Figure 17:
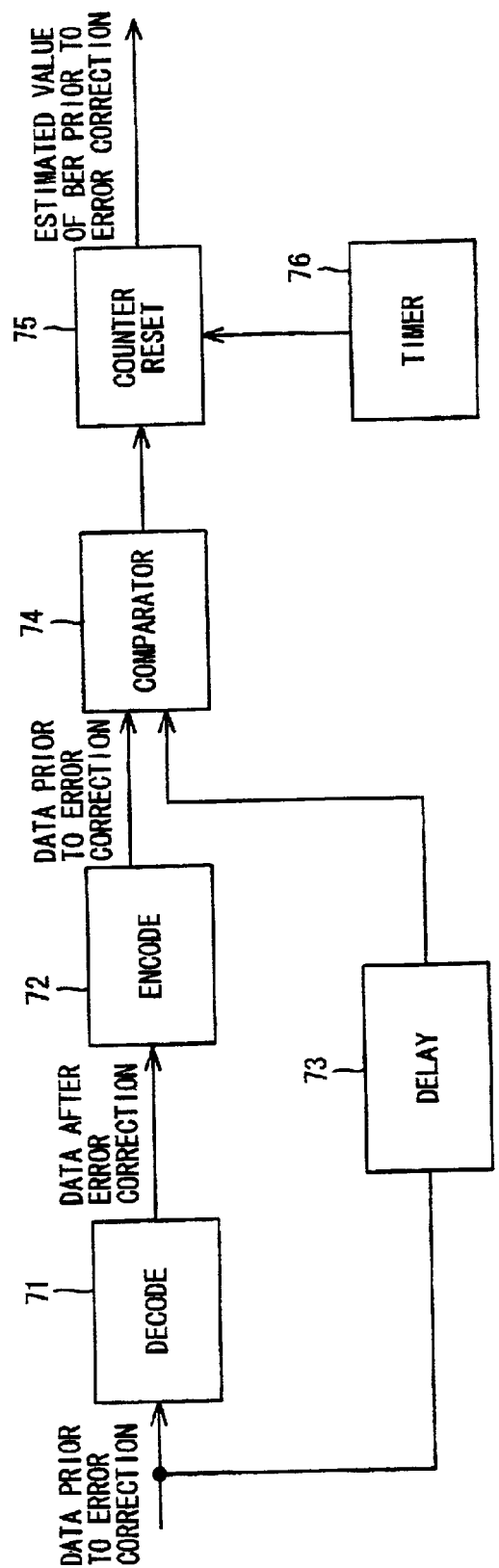
FIG. 17 is a block diagram showing a BER estimating circuit.

FIG. 17 illustrates an embodiment of a circuit for estimating BER prevailing prior to error correction. When data discrimination is performed in the RAKE demodulator 202 (FIG. 16), the BER estimating circuit 232 estimates the BER prevailing prior to error correction by using the discriminated data (the data prior to the error correction). Specifically, a decoder 71 performs decoding while applying error-correction processing to the RAKE-demodulated data (the data prior to error correction), and an encoder 72 performs encoding while adding an error-detection code onto the decoded data. A delay unit 73 delays the input data for a period of time needed for decoding and encoding processing, and a comparator 74 compares the data prior to the error correction output from the delay unit 73 and the encoded data output from the encoder 72. Correctable error is corrected by the decoding processing of decoder 71 and error-free encoded data ideally is output from the encoder 72. Accordingly, error data contained in the data prevailing prior to error correction is detected from the comparator 74, and a counter 75 counts error data generated within a prescribed period of time and outputs the value of the count as BER prior to error correction. A timer 76 resets the value of the count of counter 75 at the prescribed time interval.

First Modification

Figure 18:
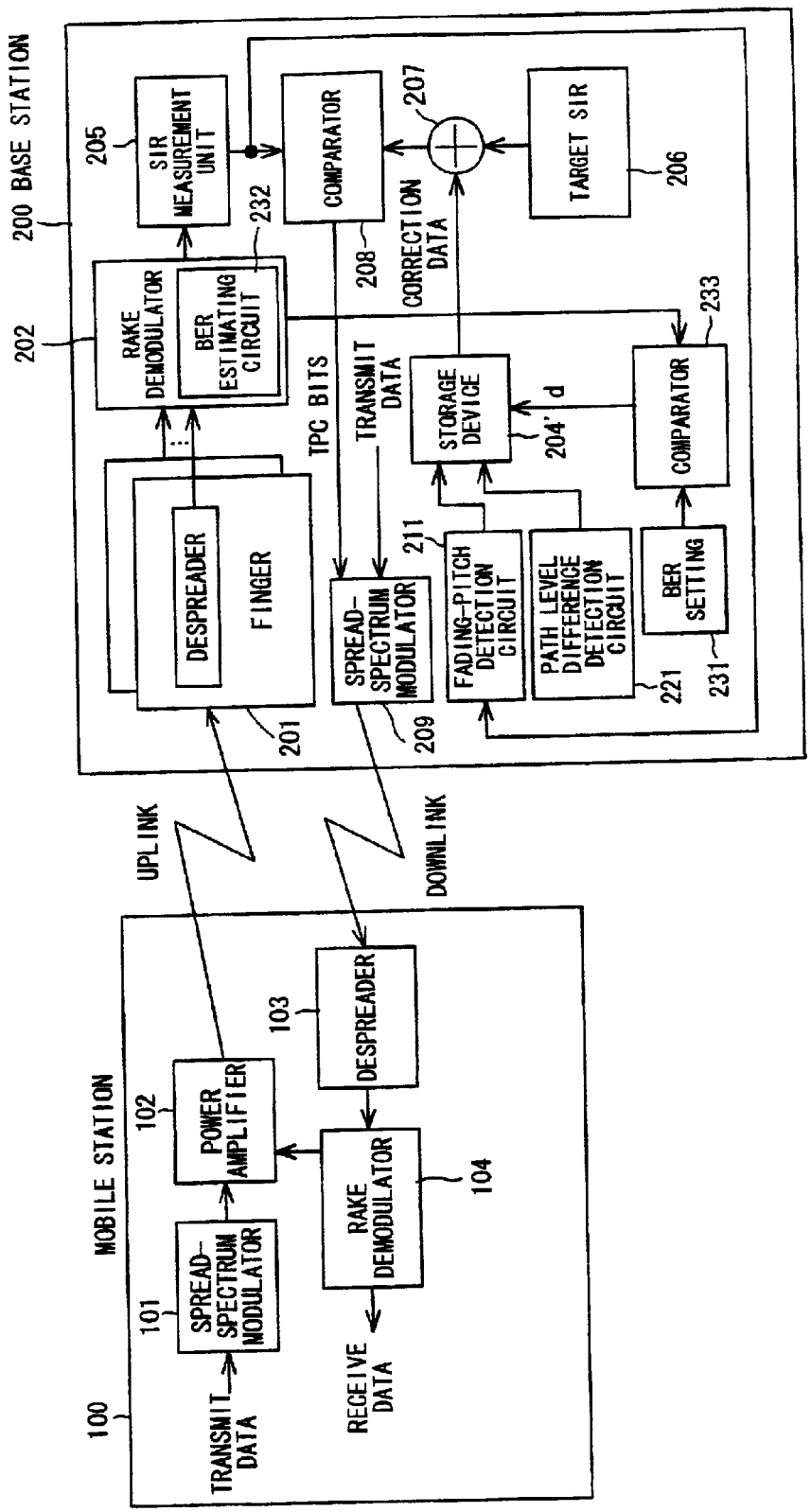
FIG. 18 is a diagram showing a first modification of transmission power control for correcting a target SIR based upon fading pitch, level differences between paths and an estimated value of BER.

In the embodiment of FIG. 16, fading pitch is detected using the pilot signal. However, it can be so arranged that fading pitch is detected using receive SIR. FIG. 18 is a block diagram of such a modification. This differs from the embodiment of FIG. 16 in that the fading-pitch detection circuit 211 (see FIG. 4) is provided to detect fading pitch based upon receive SIR. Transmission power control is the same as that of the embodiment of FIG. 16.

Second Modification

Figure 19:
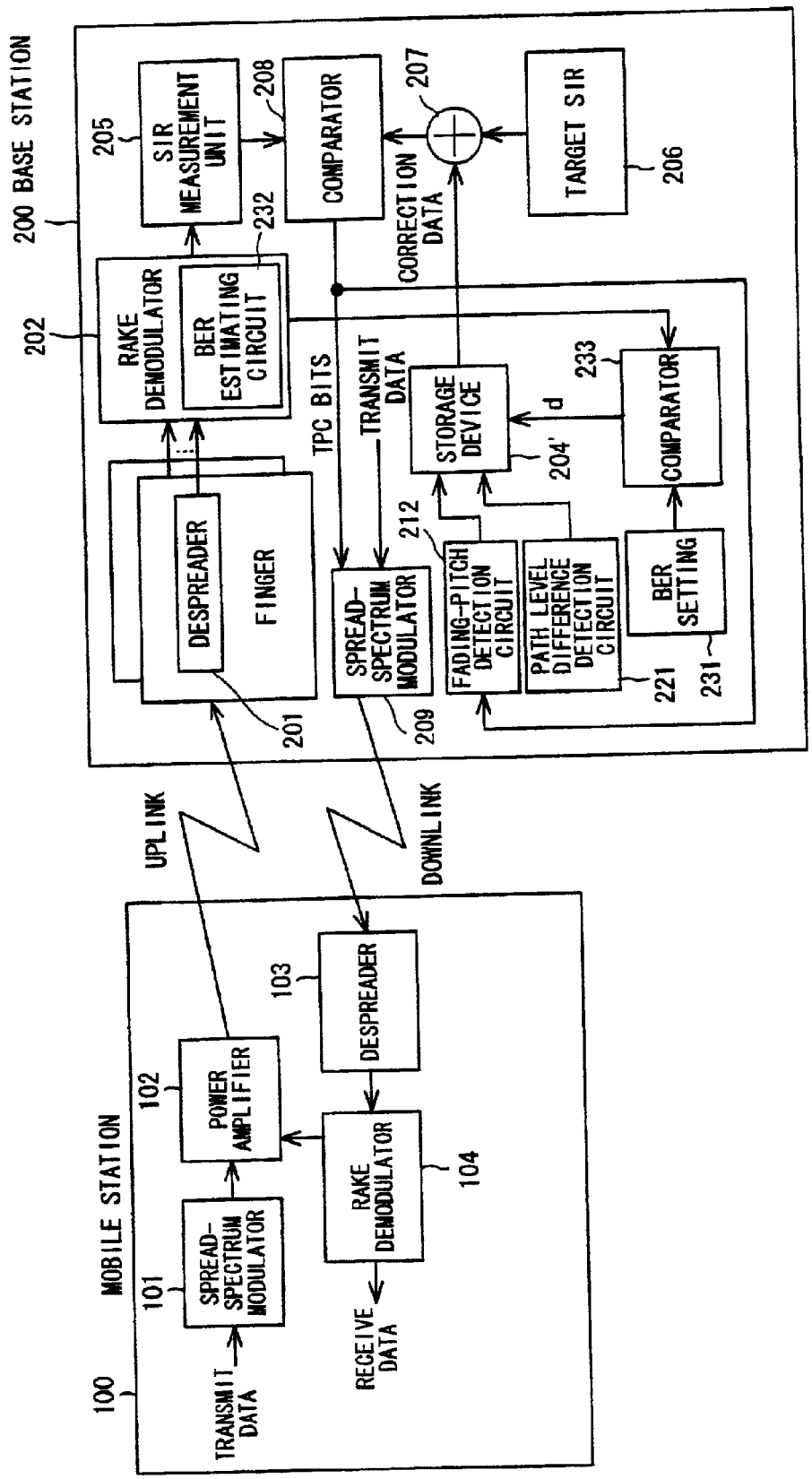
FIG. 19 is a diagram showing a second modification of transmission power control for correcting a target SIR based upon fading pitch, level differences between paths and an estimated value of BER.

In the embodiment of FIG. 16, fading pitch is detected using the pilot signal. However, it can be so arranged that fading pitch is detected using a change in the power control direction of TPC bits. FIG. 19 is a block diagram of such a modification. This differs from the embodiment of FIG. 16 in that the fading-pitch detection circuit 212 (see FIG. 5) is provided to detect fading pitch based upon a change in the transmission power control direction of TPC bits. Transmission power control is the same as that of the embodiment of FIG. 16.

Figure 20:
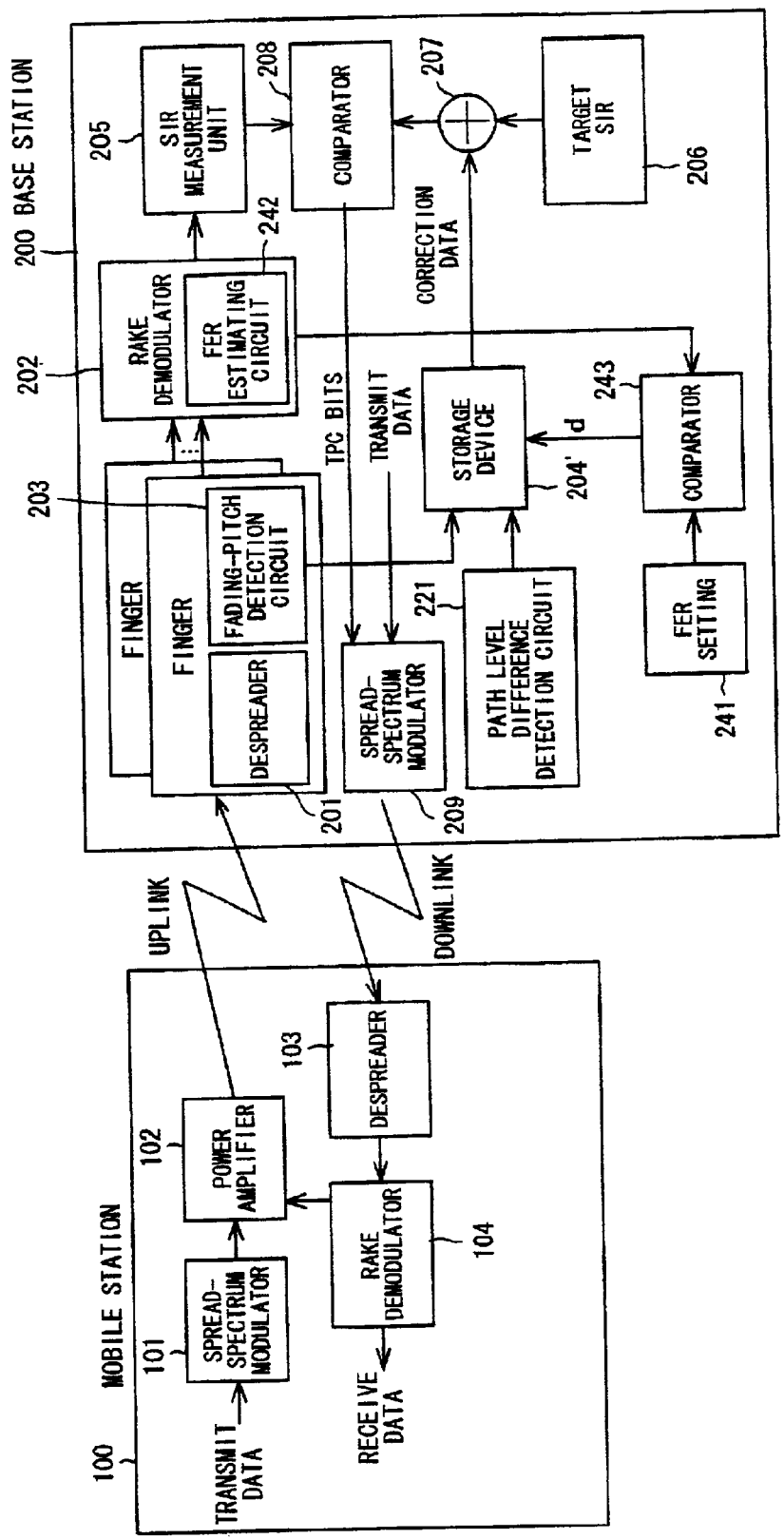
FIG. 20 is a diagram showing an embodiment of transmission power control for correcting a target SIR based upon fading pitch, level differences between paths and an estimated value of FER.

(H) Transmission Power Control for correcting Target SIR by Difference Between Measured FER and Set FER FIG. 20 illustrates an embodiment for correcting a target SIR based upon fading pitch, level differences between paths and a difference between measured FER and target FER. Components identical with those shown in FIG. 13 are designated by like reference characters. This embodiment differs in that:

(1) correction data is stored in the rewritable storage device 204' rather than a ROM;

(2) a setting unit 241 sets a FER, which prevails after error correction, such that the BER after error correction will attain a desired value, e.g., $10^{-3}$;

(3) a FER estimating circuit 242 measures the actual FER after error correction; and (4) on the basis of the difference between the set FER and estimated FER, a comparator 243 updates the value of correction data that has been stored in the storage device 204' and inputs the updated data to the correction unit 207.

The correction data is initially set in the storage device 204' by a method identical with that of FIG. 13. When transmission power control is performed, the fading-pitch detection circuit 203 (see FIG. 2) detects fading pitch using the pilot signal and inputs the fading pitch to the storage device 204'. Further, the path level difference detection circuit 221 (see FIG. 9) arranges the reception levels of each of the paths in order of decreasing size, calculates the level differences A, B, C between mutually adjacent reception levels and inputs addresses conforming to the combinations of the level differences A, B, C to the storage device 204'.

In parallel with the foregoing, the FER estimating circuit 242 estimates the FER that prevails after error correction and inputs this FER to the comparator 243. The comparator 243 calculates a difference d between the set FER and estimated FER and inputs this difference to the storage device 204'. The correction data ΔS is read out of the storage device 204' from a storage area designated by a combination of the fading pitch and an address that corresponds to the level differences between paths, the correction data is increased or decreased in value based upon the difference d between set FER and estimated FER, the old data is updated by the correction data after the increase or decrease in value, and the corrected data after updating is input to the target-SIR correction unit 207. Transmission power control similar to that of FIG. 6 is then carried out and the BER after the error correction is maintained at $10^{-3}$. If the estimated FER is worse than the set FER, correction data in the storage device 204' is updated so as to increase the value. If the estimated FER is better than the set FER, correction data in the storage device 204' is updated so as to decrease the value. The updated data is input to the target-SIR correction unit 207.

Figure 21:
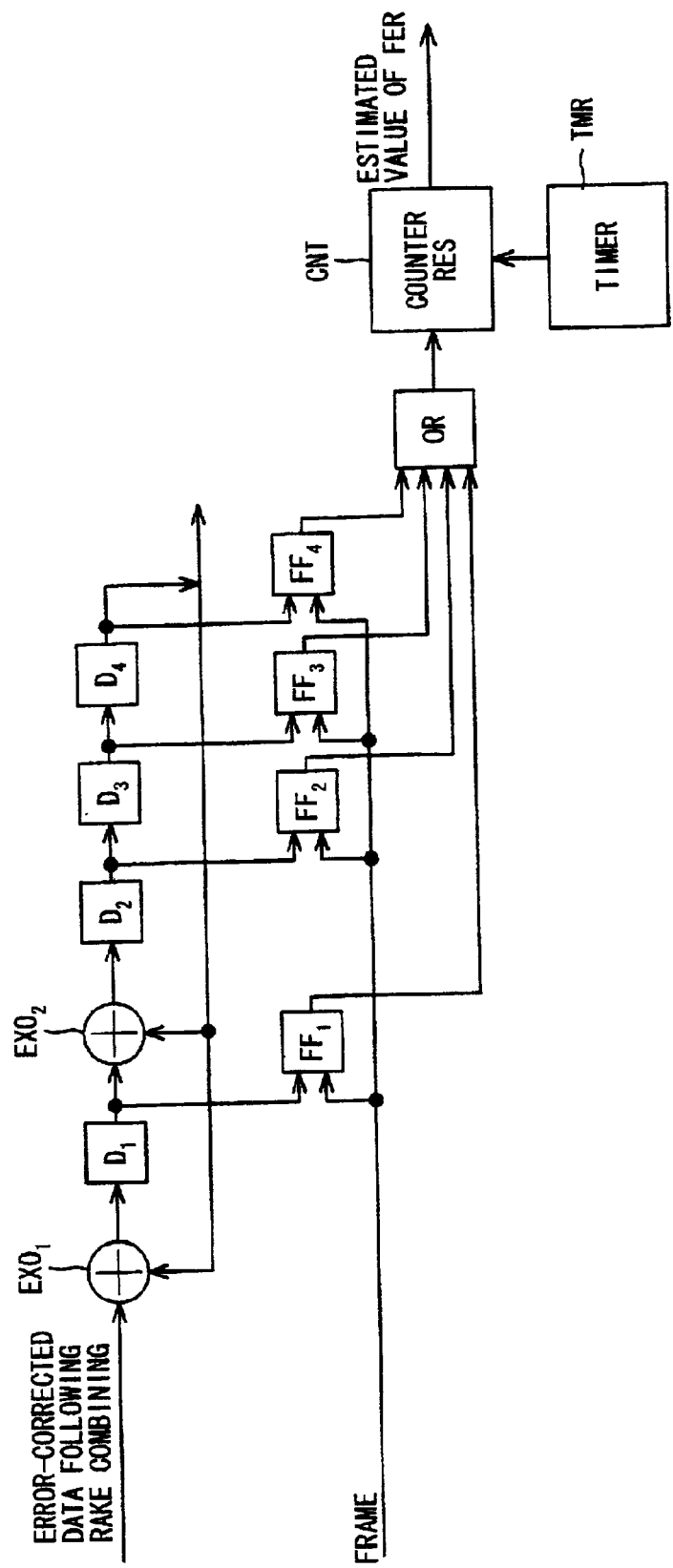
FIG. 21 is a block diagram showing a BER estimating circuit.

FIG. 21 illustrates an embodiment of a circuit for estimating FER prevailing after error correction. This circuit uses a CRC check to find the FER. A CRC check is such that when division is performed by a prescribed generating polynomial on the receiving side, a redundant bit is added on frame by frame on the transmitting side in such a manner that the remainder will become zero. Accordingly, if the result of division on the receiving side is that the remainder is zero, the frame will be free of error; if there is a remainder, then the frame contains an error. The generating polynomial in this FER estimating circuit is assumed to be $1+X+X^4$, for example, and the contents of shift registers $D_1$ to $D_4$ after all input signals have eventually been input to the FER estimating circuit are remainders. Accordingly, if there is even one logical sum of all of the remainders, then this means that the frame contains an error. By counting this value, the estimated value of FER can be detected.

The FER estimating circuit of FIG. 21 includes flip-flops $D_1$ to $D_4$ constructing a shift register, exclusive-OR circuits EXO1, EXO2, flip-flops $FF_1$ to $FF_4$ in which the contents of the shift registers are set in sync with the frame pulses, an OR gate OR for taking the logical sum of the flip-flop and outputting a frame-error signal, a counter CNT for counting a high-level frame-error signal output from the OR gate, and a timer TMR for resetting the content of the counter at prescribed time intervals.

First Modification

Figure 22:
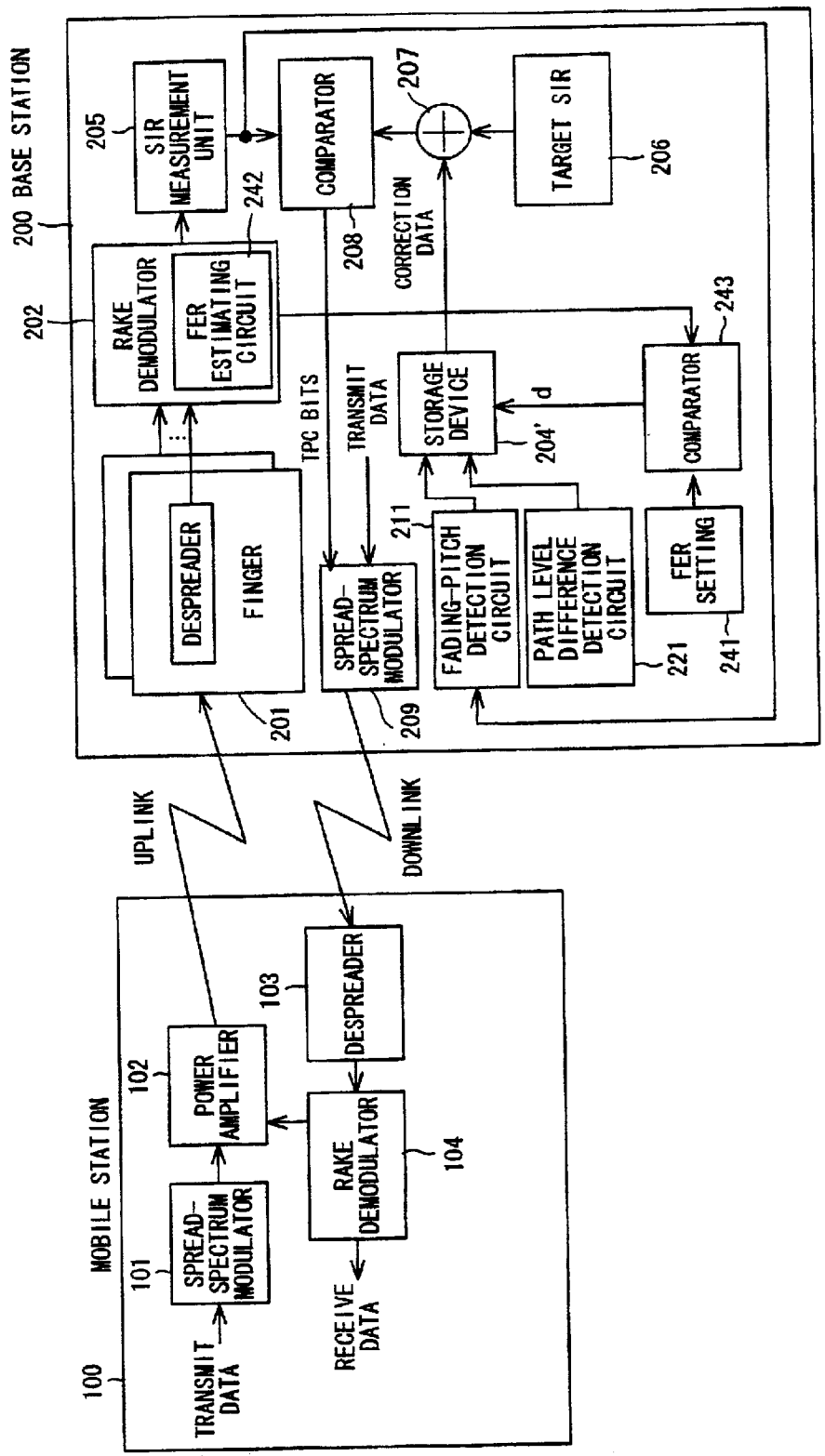
FIG. 22 is a diagram showing a first modification of transmission power control for correcting a target SIR based upon fading pitch, level differences between paths and an estimated value of FER.
Figure 23:
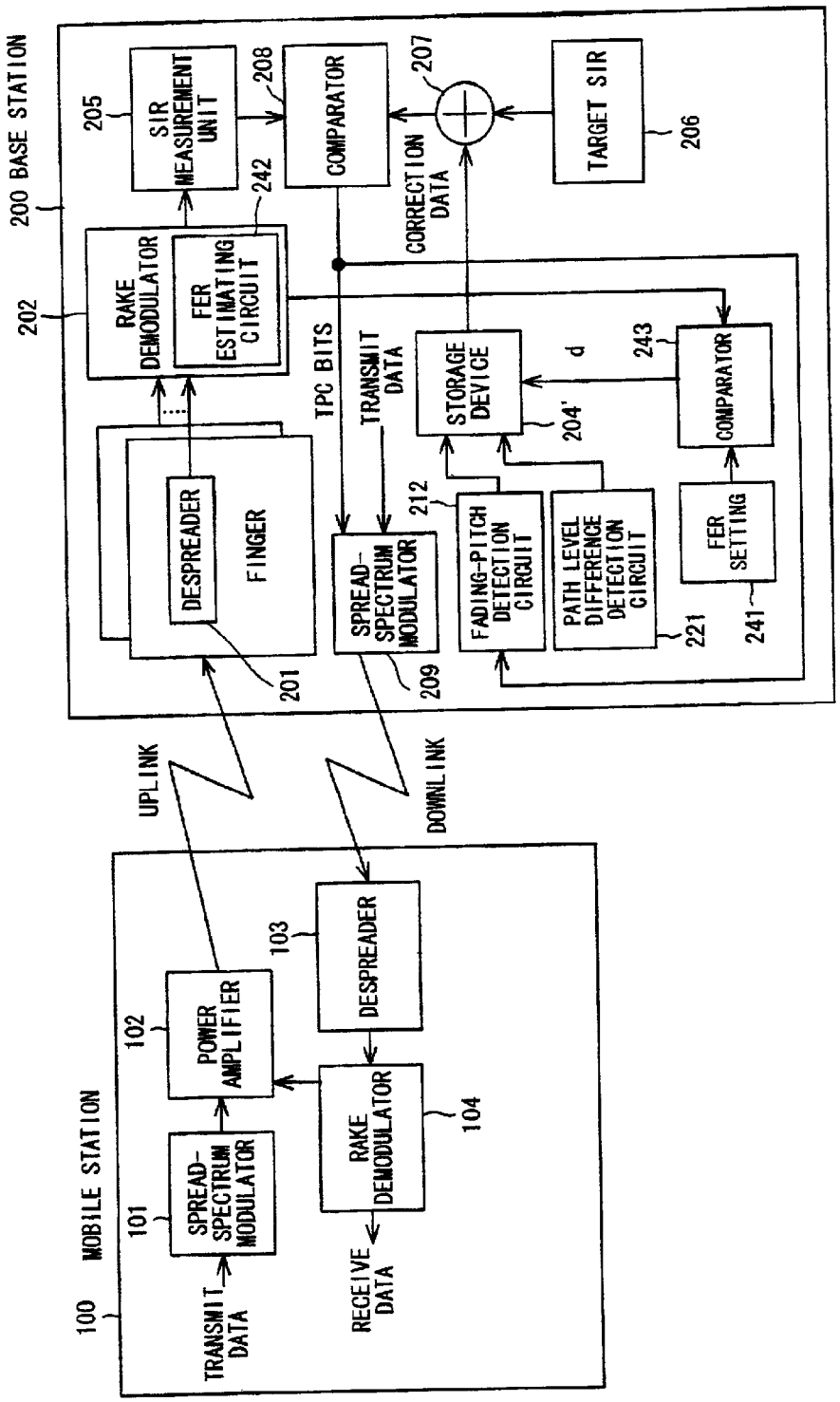
FIG. 23 is a diagram showing a second modification of transmission power control for correcting a target SIR based upon fading pitch, level differences between paths and an estimated value of FER.
Figure 24:
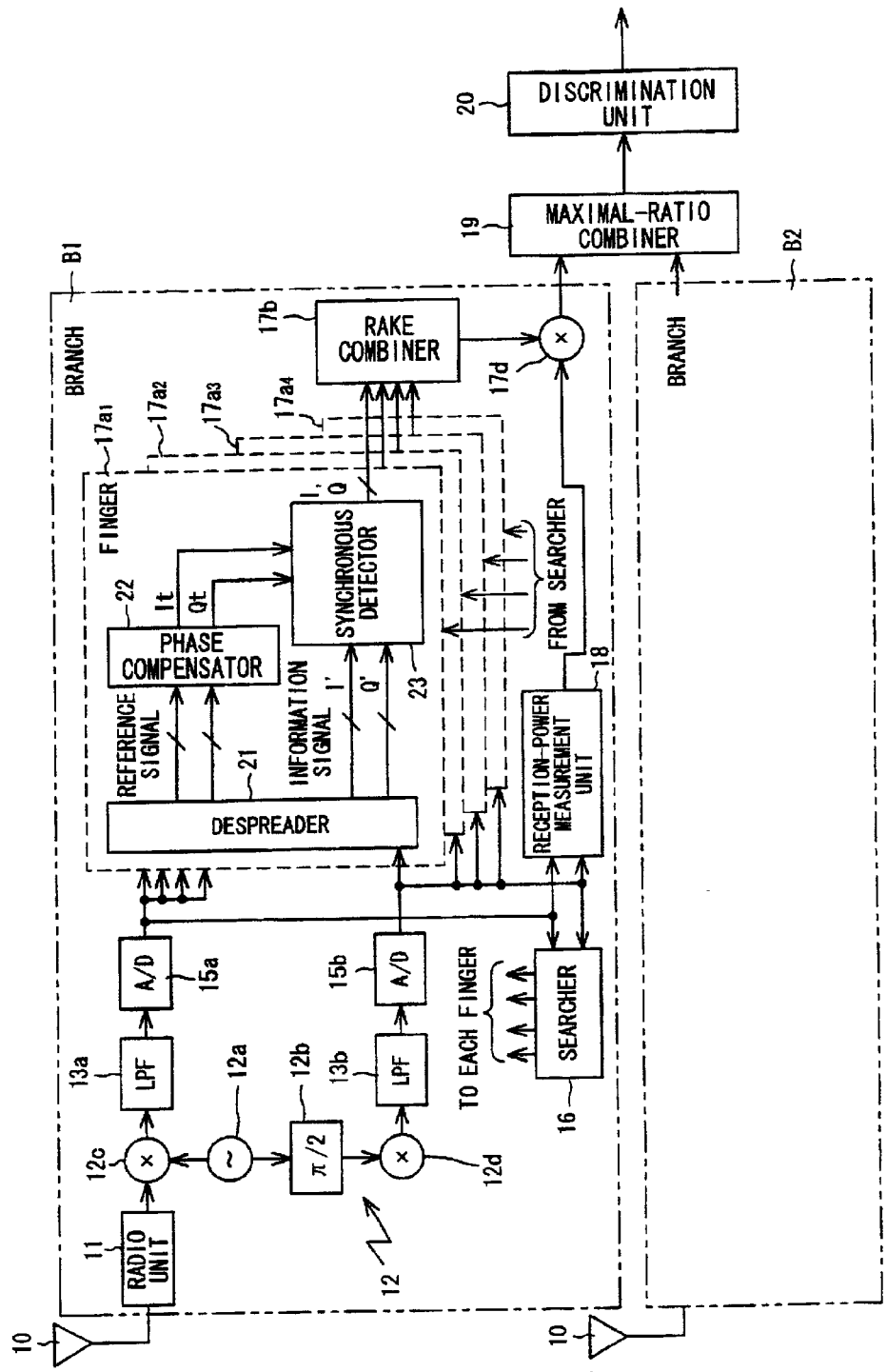
FIG. 24 is a block diagram showing a CDMA receiver composed of a plurality of branches.
Figure 25:
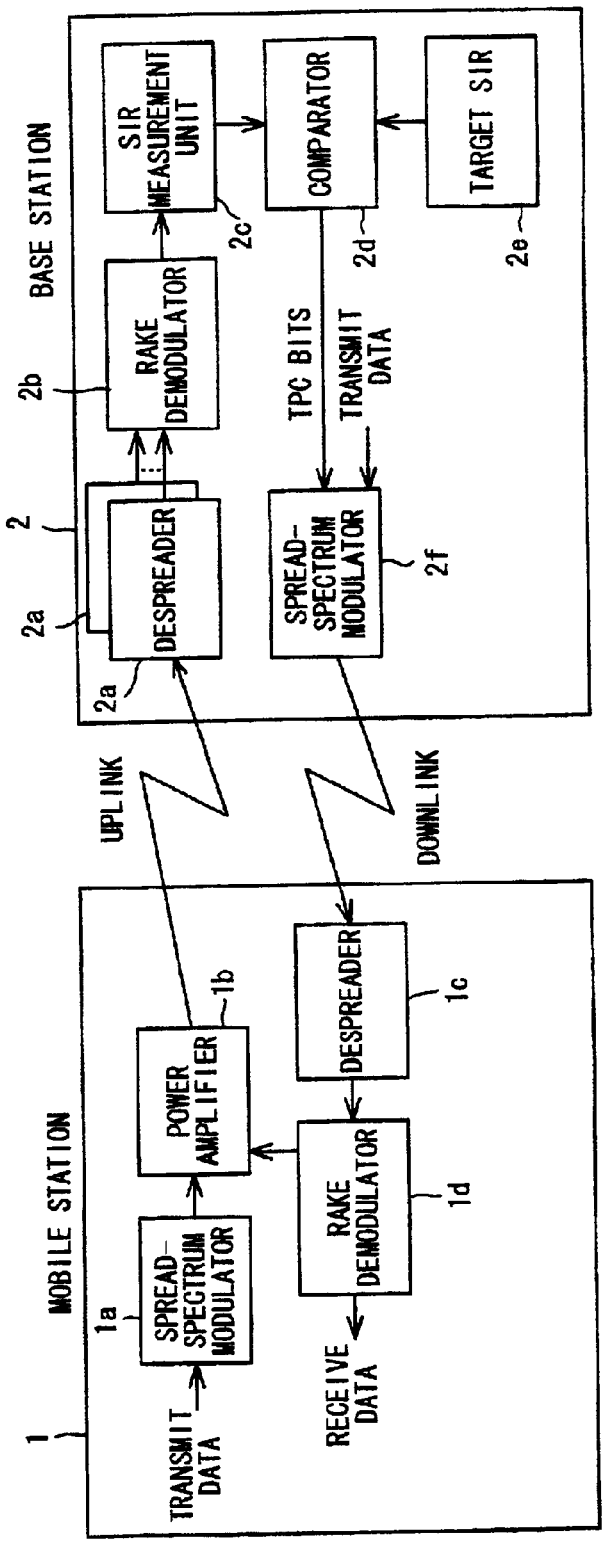
FIG. 25 is a block diagram showing the conventional structure of uplink-channel closed-loop transmission power control.
Figure 27:
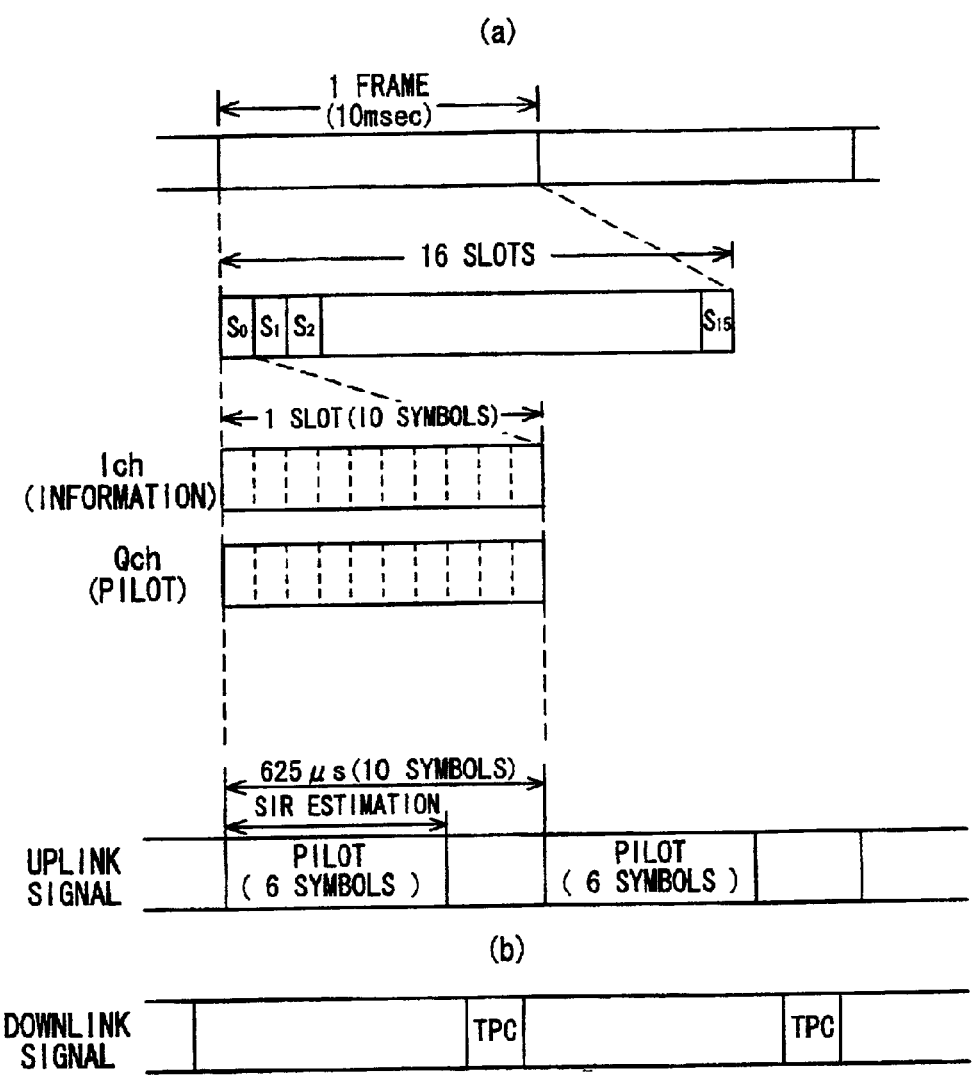
FIG. 27 is a diagram of frame/slot structure.

In the embodiment of FIG. 20, fading pitch is detected using the pilot signal. However, it can be so arranged that fading pitch is detected using receive SIR. FIG. 22 is a block diagram of such a modification. This differs from the embodiment of FIG. 20 in that the fading-pitch detection circuit 211 (see FIG. 4) is provided to detect fading pitch based upon receive SIR. Transmission power control is the same as that of the embodiment of FIG. 20.

Second Modification

In the embodiment of FIG. 20, fading pitch is detected using the pilot signal. However, it can be so arranged that fading pitch is detected using a change in the power control direction of TPC bits. FIG. 15 is a block diagram of such a modification. This differs from the embodiment of FIG. 20 in that the fading-pitch detection circuit 212 (see FIG. 5) is provided to detect fading pitch based upon a change in the transmission power control direction of TPC bits. Transmission power control is the same as that of the embodiment of FIG. 16.

(G) Effects of the Invention

Thus, in accordance with the present invention, even if there is an increase in the rate of change in fading, the desired BER can be maintained by enlarging target SIR.

Further, in accordance with the present invention, even if a level difference between signals that arrive via the paths of multiple paths varies, the desired BER can be maintained by changing the target SIR.

Further, in accordance with the present invention, the desired BER can be maintained even if rate of change in fading and a level difference between signals that arrive via the paths of multiple paths vary simultaneously.

Further, in accordance with the present invention, bit error rate BER is measured, the target SIR is corrected based upon the difference between the measured BER and a target BER and the transmission power of the mobile station is controlled in such a manner that the measured SIR will agree with the corrected target SIR. As a result, the desired BER can be obtained with a higher degree of precision.

Further, in accordance with the present invention, frame error rate FER is measured, the target SIR is corrected based upon the difference between the measured FER and a target FER and the transmission power of the mobile station is controlled in such a manner that the measured SIR will agree with the corrected target SIR. As a result, the desired BER can be obtained with a higher degree of precision.

What is claimed is:

1. A transmission power control apparatus in a base station for measuring SIR, which is a ratio of a received signal to an interference signal, and controlling transmission power of a mobile station in such a manner that said measured SIR agrees with a target SIR, comprising:

a searcher for detecting multipath and levels of signals that arrive via respective ones of the paths;

a level-difference calculation unit for calculating plural level differences between mutually adjacent reception levels using the levels of signals;

a correction unit for correcting the target SIR based upon a combination of said plural level differences between mutually adjacent reception levels; and means for creating a command, which controls transmission power of the mobile station in such a manner that the measured SIR agrees with said corrected target SIR, and transmitting this command to the mobile station.

2. A transmission power control apparatus according to claim 1, further comprising a memory for rounding, as (Lmax−Ls), levels for which the level difference from a maximum level Lmax is less than a set value Ls, and storing correction values of target SIR in correspondence with combinations of level differences between mutually adjacent reception levels in the order of the reception levels;

wherein said level-difference calculation unit arranges the reception levels of each of the paths of the multiple paths in order of decreasing or increasing size and calculates level differences between mutually adjacent reception levels; and said correction unit corrects the target SIR using a correction value corresponding to the combination of level differences read out of the memory.

3. A transmission power control apparatus in a base station for measuring SIR, which is a ratio of a received signal to an interference signal, and controlling transmission power of a mobile station in such a manner that said measured SIR agrees with a target SIR, comprising:

a fading detector for detecting rate of change in fading;

a searcher for detecting multipath and levels of signals that arrive via respective ones of the paths;

a level-difference calculation unit for calculating plural level differences between mutually adjacent reception levels using the levels of signals;

a correction unit for correcting the target SIR based upon a combination of the rate of change in fading and said plural level differences between mutually adjacent reception levels; and means for creating a command, which controls transmission power of the mobile station in such a manner that the measured SIR agrees with said corrected target SIR, and transmitting this command to the mobile station.

4. A transmission power control apparatus in a base station for measuring SIR, which is a ratio of a received signal to an interference signal, and controlling transmission power of a mobile station in such a manner that said measured SIR agrees with a target SIR, comprising:

a fading detector for detecting rate of change in fading;

a searcher for detecting multipath and levels of signals that arrive via respective ones of the paths;

a level-difference calculation unit for calculating plural level differences between mutually adjacent reception levels using the levels of signals;

a BER measurement unit for measuring bit-error rate BER;

a correction unit for correcting the target SIR based upon a combination of the rate of change in fading, said plural level differences between mutually adjacent reception levels and a difference between measured BER and target BER; and means for creating a command, which controls transmission power of the mobile station in such a manner that the measured SIR agrees with said corrected target SIR, and transmitting this command to the mobile station.

5. A transmission power control apparatus according to claim 4, further comprising a memory for storing correction values of target SLR in correspondence with combinations of rate change in fading and level differences between paths;

wherein said correction unit corrects a correction value, which corresponds to a combination of the rate of change in fading and the level differences between paths read out of the memory, on the basis of the difference between measured BER and target BER, and corrects the target SIR by said correction value.

6. A transmission power control apparatus in a base station for measuring SIR, which is a ratio of a received signal to an interference signal, and controlling transmission power of a mobile station in such a manner that said measured SIR agrees with a target SIR, comprising:

a fading detector for detecting rate of change in fading;

a searcher for detecting multipath and levels of signals that arrive via respective ones of the paths;

a level-difference calculation unit for calculating plural level differences between mutually adjacent reception levels using the levels of signals;

a FER measurement unit for measuring frame-error rate FER;

a correction unit for correcting the target SIR based upon a combination of the rate of change in fading and said plural level differences between mutually adjacent reception levels and a difference between the measured FER and target FER; and means for creating a command, which controls transmission power of the mobile station in such a manner that the measured SIR will agree with said corrected target SIR, and transmitting this command to the mobile station.

7. A transmission power control apparatus according to claim 6, further comprising a memory for storing correction values of target SIR in correspondence with combinations of rate change in fading and level differences between paths;

wherein said correction unit corrects a correction value, which corresponds to a combination of the rate of change in fading and the level differences between the paths read out of the memory, on the basis of the difference between the measured FER and the target FER, and corrects target SIR by said correction value.

8. A transmission power control apparatus according to claim 3, 4, or 6, wherein said fading detector detects the rate of change in fading from a difference between phase of a pilot signal, which has been received from the mobile station before a prescribed time in the past and phase of the pilot signal at the present time.

9. A transmission power control apparatus according to claim 3, 4, or 6, wherein said fading detector detects the rate of change in fading based upon the measured SIR.

10. A transmission power control apparatus according to claim 3, 4, or 6, wherein said fading detector detects the rate of change in fading based upon direction of transmission power control by TPC bits.

* * * * *